United States Patent
Nohara et al.

(10) Patent No.: US 9,291,707 B2
(45) Date of Patent: Mar. 22, 2016

(54) DEVICE AND METHOD FOR 3D SAMPLING WITH AVIAN RADAR

(75) Inventors: Timothy J. Nohara, Fonthill (CA); Peter T. Weber, Dundas (CA); Andrew M. Ukrainec, Etobicoke (CA); Al-Nasir Premji, North Vancouver (CA); Graeme S. Jones, Waterloo (CA); Nelson Costa, Grimsby (CA); Robert C. Beason, Huron, OH (US)

(73) Assignee: Accipiter Radar Technologies nc., Fenwick (CA)

( * ) Notice: Subject to any disclaimer, the term of this patent is extended or adjusted under 35 U.S.C. 154(b) by 766 days.

(21) Appl. No.: 13/606,222

(22) Filed: Sep. 7, 2012

(65) Prior Publication Data

US 2015/0204973 A1    Jul. 23, 2015

Related U.S. Application Data

(60) Provisional application No. 61/532,812, filed on Sep. 9, 2011.

(51) Int. Cl.
*G01S 13/72*    (2006.01)
*G01S 13/42*    (2006.01)
(Continued)

(52) U.S. Cl.
CPC ............... *G01S 13/72* (2013.01); *G01S 7/003* (2013.01); *G01S 13/426* (2013.01); *G01S 13/58* (2013.01); *G01S 13/726* (2013.01); *G01S 13/878* (2013.01); *G01S 13/88* (2013.01); *G01S 7/411* (2013.01)

(58) Field of Classification Search
CPC ......... G01S 13/02; G01S 13/50; G01S 13/58; G01S 13/66; G01S 13/72; G01S 13/723; G01S 13/726; G01S 7/02; G01S 7/41; G01S 7/411; G01S 13/06; G01S 13/42; G01S 13/426; G01S 13/87; G01S 13/878; G01S 13/88; G01S 13/93; G01S 7/003; G01S 13/003; G01S 13/52; G01S 13/56; H01Q 25/00

USPC ............... 342/27, 28, 73–81, 89, 94–97, 342/104–115, 118, 146, 147, 158, 175, 342/192–197, 29–51, 59, 21, 22, 188–191, 342/176–183; 701/1, 120, 116, 119, 400, 701/408, 514; 707/609, 674, 678, 679
See application file for complete search history.

(56) References Cited

U.S. PATENT DOCUMENTS 2,444,770 A    7/1948  Fyler
2,444,771 A    7/1948  Fyler
(Continued)

FOREIGN PATENT DOCUMENTS

EP    0033059 A2    8/1981
GB    2176073 A    12/1986
(Continued)

OTHER PUBLICATIONS

"Vessell Traffic Management & Information Systems Applications". Norcontrol IT AS. Aug. 2000.
(Continued)

*Primary Examiner* — Bernarr Gregory
(74) *Attorney, Agent, or Firm* — R. Neil Sudol; Henry D. Coleman

(57) ABSTRACT

A 3D avian radar sampling system comprises a 3D volume scanning radar system and an avian track interpreter. Scanning methods employed ensure that volume revisit times are suitably short and track data produce 3D target trajectories. The avian interpreter uses the track data from the volume scanning radar to create detailed avian activity reports that convey bird abundance and behavior within a 3D cylindrical volume on intervals including hourly, daily, weekly, monthly and yearly. Hourly activity reports (updated typically every 15 minutes) provide enhanced situational awareness of developing hazards and are actionable, allowing operators to dispatch wildlife control personnel to respond to threats.

55 Claims, 8 Drawing Sheets

(51) Int. Cl.
*G01S 13/87* (2006.01)
*G01S 13/88* (2006.01)
*G01S 7/00* (2006.01)
*G01S 13/58* (2006.01)
G01S 13/00 (2006.01)
G01S 7/41 (2006.01)

(56) References Cited

U.S. PATENT DOCUMENTS

| | | | |
|---|---|---|---|
| 2,497,913 A | 2/1950 | Rines | |
| 2,519,397 A | 8/1950 | Ranger | |
| 2,597,348 A | 5/1952 | Longacre et al. | |
| 2,624,874 A | 1/1953 | Rines | |
| 2,822,537 A | 2/1958 | Bartellnk | |
| 2,946,996 A | 7/1960 | Wassell | |
| 3,056,129 A * | 9/1962 | Albersheim | H01Q 25/00 342/158 |
| 3,070,795 A | 12/1962 | Chambers | |
| 3,072,903 A | 1/1963 | Meyer | |
| 3,214,755 A | 10/1965 | Blass et al. | |
| 3,267,270 A | 8/1966 | Smidowicz | |
| 3,267,271 A | 8/1966 | Kindle | |
| 3,274,593 A | 9/1966 | Varela et al. | |
| 3,448,450 A | 6/1969 | Alfandari et al. | |
| 3,691,558 A * | 9/1972 | Hoard | G01S 13/56 342/28 |
| 3,697,990 A | 10/1972 | Emch | |
| 3,778,827 A | 12/1973 | Strenglein | |
| 3,971,020 A | 7/1976 | Howard | |
| 4,150,378 A | 4/1979 | Barton | |
| 4,347,513 A * | 8/1982 | Schindler | G01S 7/003 342/59 |
| 4,866,447 A * | 9/1989 | Loucks | G01S 13/87 342/59 |
| 4,963,888 A * | 10/1990 | Taylor et al. | 342/105 |
| 5,254,999 A | 10/1993 | Lee | |
| 5,278,564 A | 1/1994 | Groenenboom | |
| 5,663,720 A | 9/1997 | Weissman | |
| 5,696,503 A * | 12/1997 | Nasburg | 701/119 |
| 5,765,166 A * | 6/1998 | Gotfried et al. | 342/190 |
| 5,774,088 A * | 6/1998 | Kreithen | 342/22 |
| 5,848,378 A | 12/1998 | Shelton et al. | |
| 5,923,285 A | 7/1999 | Andrusiak et al. | |
| 5,971,580 A | 10/1999 | Hall et al. | |
| 6,211,810 B1 * | 4/2001 | Schirf | 342/36 |
| 6,211,814 B1 | 4/2001 | Benjamin et al. | |
| 6,249,241 B1 | 6/2001 | Jordan et al. | |
| 6,377,204 B1 * | 4/2002 | Wurman | G01S 13/003 342/147 |
| 6,411,900 B1 * | 6/2002 | Flick | 701/514 |
| 6,653,971 B1 * | 11/2003 | Guice et al. | 342/27 |
| 6,832,156 B2 | 12/2004 | Farmer | |
| 6,985,837 B2 | 1/2006 | Moon et al. | |
| 7,016,772 B2 | 3/2006 | Yanagi | |
| 7,183,969 B2 * | 2/2007 | Pozgay | G01S 13/87 342/59 |
| 7,358,892 B2 * | 4/2008 | Thome | G01S 13/87 342/59 |
| 7,501,979 B1 * | 3/2009 | Guice et al. | 342/27 |
| 7,551,120 B1 * | 6/2009 | Bailly et al. | 342/40 |
| 7,664,596 B2 * | 2/2010 | Wise et al. | 701/120 |
| 7,864,103 B2 | 1/2011 | Weber et al. | |
| 7,948,429 B2 * | 5/2011 | Drake et al. | 342/188 |
| 8,156,083 B2 * | 4/2012 | Banerjee et al. | 707/679 |
| 8,400,348 B1 * | 3/2013 | Guice et al. | 342/175 |
| 8,456,349 B1 * | 6/2013 | Piesinger | 342/29 |
| 8,723,719 B1 * | 5/2014 | Piesinger | 342/29 |
| 2003/0025629 A1 | 2/2003 | Barrock et al. | |
| 2003/0028293 A1 | 2/2003 | Jankowiak et al. | |
| 2004/0233098 A1 | 11/2004 | Millikin et al. | |
| 2007/0269102 A1 | 11/2007 | Wang | |

FOREIGN PATENT DOCUMENTS

| | | |
|---|---|---|
| JP | 02290990 | 11/1990 |
| JP | 08-110380 A | 4/1996 |
| JP | 63-215983 | 9/1998 |
| JP | 2007-010629 A | 1/2007 |

OTHER PUBLICATIONS

"Norcontrol IT Wins Major U.S. Contract"; KNC News Archive; Jun. 13, 2001.
"Litton Marine Systems Introduces New-Generation Vessel Traffice System (VTS)"; Soerry Marine News & Press Releases; Jul. 28, 2000; pp. 1-5.
Vessel Traffic Management & Information System VTMIS5060; NOR Control IT AS; 2004; pp. 1-2.
"Low-Cost Radar Surveillance of Inland Waterways for Homeland Security Applications"; Peter Weber, et al.; Apr. 26-29, 2004; pp. 1-6.
"Multiple-Target Tracking with Radar Applications"; Samuel S. Blackman; pp. 92-107.
"Affordable Avian Radar Surveillance Systems for Natural Resource Management and BASH Applications"; Tim Nohara, et a;. 2005, pp. 1-6.
"Mathematical Techniques in Multisensor Data Fusion"; David L. Hall; pp. 1-8.
"Maritime Safety, Security, & Surveillance." Lockheed Martin Brochure. Jan. 2003. 8 pages.
"Affordable, Real-Time 3-D Avian Radar Networks for Centralized North American Bird Advisory Systems"; Peter Weber, et al. Aug. 2005, pp. 1-8.
"An Algorithm for Tracking Multiple Targets." Reid, Donald. IEEE Transactions on Automatic Control. vol. 24, Issue 6 Dec. 1079, pp. 843-854.
"Sicom Develops Security Radar Technology." Canadian Electronics. Nov./Dec. 2003. vol. 18, No. 7.
"IMM Algorithm for tracking targets that maneuver through coordinated turns." Proceedings of the Society of Photo-Optical Instrumentation Engineers. vol. 1698. Apr. 20-22, 1992.
"The Jindakee Operational Radar Network: Its Architecitre and Surveillance Capability." IEEE 1995 Conf. May 8-11, 1995. pp. 592-697. Cameron Alex.
"Development of a Virtual Radar Environment." International GeoScience and Remote sensing Symposium. vol. 6. Jul. 9-13, 2001. pp. 2599-2601. Chandraesekar et al.
"The Haida's Last Mission." The Standard (St. Catharines-Niagra) Aug. 27, 2003, pp. A1-A2. Currie, Bill.
"HMCS Haida voyage to resting berth Hamilton, Ontario . . . tracked using newest homeland security radar technology . . ." Fonthill, Ontario. Sicom Systems Ltd. Press Rel. Aug. 2005.

\* cited by examiner

DEVICE AND METHOD FOR 3D SAMPLING WITH AVIAN RADAR

FIELD OF THE INVENTION

This invention relates to ground-based radar systems and methods. The invention relates more additionally and more specifically to radar target tracking within a volume and the derivation of detailed information about the activity at 3D locations within the volume over various time scales. The invention is particularly useful in radar surveillance of birds and other airborne targets such as general aviation aircraft that fly unknown patterns.

BACKGROUND OF THE INVENTION

Avian radars are used to track birds in flight in the vicinity of airfields, wind farms, communications towers, oil and mining operations, and along migration routes. Birds are a significant hazard to aviation safety. Applications that require bird monitoring are the bird aircraft strike hazard (BASH) management problem and the natural resource management (NRM) problem. Billions of dollars in damage to aircraft and significant loss of life have been recorded due to birds flying into aircraft, particularly during take-off and landing in the vicinity of airports.

The danger associated with birds depends on their altitude (among other factors). End-users of bird detection and tracking radars need to know the 3D locations (i.e. latitudes, longitudes and altitudes) of tracked birds. State-of-the-art avian radars provide target tracking only within a slice of the 3D surveillance volume and with high-resolution localization only in two dimensions.

As with any instrumentation that continuously collects data, digital avian radars generate large volumes of information. To be beneficial, those data must be analyzed and presented in a manner that is relevant to the end-user. The three-dimensional locations of the targets are one of the most important pieces of information obtained from avian radar tracks. The more accurate and precise the data, the more useful they are. Location is of obvious importance to accurately track the position of the bird over the terrain. Altitude is important for determining whether the bird is at an altitude such that it poses a threat to aircraft in flight.

In order to try and assess bird behavior, wildlife managers and ornithologists visually monitor birds. They identify and count birds at various locations and times of day, and may also note additional information such as the species, flight pattern, altitude, etc. Because of limited resources, these counts tend to be sparse in both their spatial and temporal aspects. Because of the sparseness, the attempted assessment of general bird behavior lacks critical information.

State-of-the-art avian radars use inexpensive, commercial-off-the-shelf (COTS) X-band (or S-band) marine radar transceivers, fitted with slotted-waveguide array antennas, as well as parabolic reflector or Cassegrain (dish) antennas. The raw received baseband signals are digitized, followed by detection, tracking and display of bird targets. State-of-the-art avian radars provide continuous, day or night, all-weather, situational awareness with automated detection, localization and warnings of hazards within the small slice of the 3D surveillance volume they monitor. They provide high-quality, real-time target track data with sophisticated criteria to determine potentially dangerous target behavior, as well as communication of real-time alerts to end-users who require that information. They also minimize operator interaction and in-the-loop requirements.

State-of-the-art avian radars features include:

Low-cost, high-performance radar antennas and transceivers mounted on ground-based pedestals Radar processing that can reliably detect and track small maneuvering targets in dense target and clutter environments Real-time display of target tracks in a geographic framework Automatic hazard detection and alert capability to remote end-users The formation of radar networks to provide wide-area coverage Low cost of operation Low life cycle costs Data and analysis support for research and development COTS marine radars are very inexpensive. These marine radars exhibit surprisingly good hardware specifications. However, as-is, these radars deliver mediocre performance for bird targets because of their primitive signal processing, which is only required to detect marine vessels and landmasses. Combining a COTS marine radar with a digitizer board and a software radar processor that runs on a COTS personal computer (PC) and a parabolic dish antenna forms a state-of-the-art avian radar, but one with a very limited three-dimensional (3D) localization capability.

Slotted-waveguide array antennas are used to provide two-dimensional (2D) localization (i.e. range and azimuth, which can be translated to latitude and longitude). These systems provide good volume coverage due to the typically larger vertical (elevation) beamwidth, which is on the order of 20 degrees. Such systems, however, cannot provide useful altitude estimates of tracked targets when the radar is spinning horizontally in its usual orientation. This is because the beam uncertainty in the $3^{rd}$ dimension (elevation), which is on the order of the beam extent (up to 20 degrees), is too large. For example, the elevation beam extent or altitude uncertainty for a target at a distance of just 1 km from the radar is about 1,000 feet. This means that if both a plane and a bird are being tracked by the radar at a distance of 1 km away, the radar cannot tell whether the two targets are 1,000 feet apart (i.e. one is near the ground and the other is at the upper edge of the vertical beam, 1,000 feet off the ground) or whether they are at the same altitude where a collision could occur. While some radar configurations orient the slotted-array antenna so that it spins vertically (rather than horizontally) to get a measure of altitude, see *Nocturnal Bird Migration over an Appalachian Ridge at a Proposed Wind Power Project*, Mabee et al, Wildlife Society Bulletin 34(3), 2006, page 683, they still can only operate as 2D radars. In order to measure altitude, radars in this configuration can no longer provide 360-degree azimuthal coverage (which a conventional azimuth-rotating radar provides).

Parabolic reflector or Cassegrain (dish) antennas are used today to provide a very limited 3D localization capability. These antennas employ a single beam (pencil shaped), fixed in elevation, but rotating in azimuth. The azimuth rotation results in the usual 2D, 360-degree coverage with localization in range-azimuth or latitude-longitude. However, by using a narrow pencil beam (say between 2 and 4 degrees wide), the altitude uncertainty reduces significantly as compared to the 20 deg slotted-array antenna. Using the previous example, with targets at a distance of 1 km from the radar and a 4-degree dish antenna, altitude estimates with uncertainties on the order of 200 feet are now possible. While providing useful altitude information at very short ranges, the altitude estimates are still of limited use at further ranges. Also, volume coverage is restricted accordingly with the narrower pencil beam.

Merrill I. Skolnik in his *Introduction to Radar Systems*, 2nd Edition, McGraw-Hill Book Company 1980 and his *Radar Handbook*, 2nd Edition, McGraw-Hill, Inc., 1990, describes altitude-finding radars that use nodding horizontal fan beams. These radars are steered to the bearing where targets have been detected by an independent 2D air-surveillance radar. These altitude-finding radars cannot get altitude estimates for more than 20 or so targets per minute, and have problems with azimuth-elevation (Az-El) ambiguities in dense target environments. Military airborne and land-based tracking radars provide altitude information for a single target only (via closed-loop steering in both dimensions). They use monopulse or sequential lobing techniques to obtain the off-boresight error signals, but like the altitude-finding radars, are unable to perform 3D surveillance. Military 3D surveillance radars, on the other hand, employ rotating phased array antennas that form either multiple receive beams or rapidly electronic-scanning pencil beams. See *Radar Applications*, Merrill I. Skolnik, IEEE Press New York, 1987.

State-of-the-art weather radars use a helical scanning strategy. These radars form a 3D "image" of the rain intensity in each volume element. Weather radar resolution capabilities (in both time and space) are not suitable for tracking birds.

Weather radar presents density of water in the birds as measured by reflectivity. This reflectivity can be quantified into migration traffic rates (see S. A. Gauthreaux and C. G. Belser, 1998. "Displays of Bird Movements on the WSR-88D: Patterns and Quantification", Weather and Forecasting 13: 453-464). With its most detailed data, weather radar can give an overview of the density of migrants taking off on migration from localized areas which can be correlated with habitat as described by S. A. Gauthreaux and C. G. Belser, 2005, "Radar Ornithology and the Conservation of Migratory Birds" USDA Forest Service Gen. Tech. Rep. PSW-GTR-191. However, even at its best resolution, it cannot track individual migrants.

Avian radars detect and track individual avian targets. In state-of-the-art avian radars, the numbers of targets are estimated based on reflectivity. The altitudinal distribution of birds is not achievable with the WSR-88D data without access to the data from individual scans. Even with data from individual scans the number of birds is inferred based on reflectivity. The avian targets tracked by current avian radars can be resolved into single birds or groups based on radar cross-section.

U.S. Pat. No. 7,864,103 entitled "Device and Method for 3D Avian Height-Finding Radar" is incorporated herein by reference. The radar systems and methods described therein are azimuth scanning systems with means of varying an elevation pointing angle. Those radar systems and methods are 3D surveillance volume scanning radars. The systems described in U.S. Pat. No. 7,864,103 include radars with multiple beams, slow elevation scanners, and multiple radars, and cover a 3D surveillance volume.

U.S. Pat. No. 7,940,206 entitled "Low-Cost, High-Performance Radar Networks" is also incorporated herein by reference. The radar systems and methods described therein include at least one radar with a computer on a network that tracks targets and sends target data to a radar data server with a database to store and provide data for real-time and historical access and connected to users via an interface. The systems can include detection, clutter suppression, MHT/IMM (multiple hypothesis tracking/interacting multiple models), PPI (plan position indicator) displays, real-time target displays on background map, multiple radars, remote control and operation, unattended monitoring with alerts, user-applications that integrate data from the database (e.g. real-time data into a common operating picture (COP) tactical display), multi-sensor fusion, low RCS targets including birds and aircraft, COTS marine radars, COTS computers, SQL databases, SIMD (serial instruction multiple data) programming, software-configurable processors, web servers providing data to user client applications for accessing past and live data, and track data including range, azimuth, lat, long, altitude, intensity, heading, speed, echo size, date/time.

OBJECTS OF THE INVENTION

It is an object of the present invention to provide effective, affordable, and continuous 3D target sampling of airspaces in the vicinity of aerodromes that complement and fill in the spatial and temporal gaps in situational awareness associated with visual observation methods.

It is an object of the present invention to provide improved state-of-the-art avian radar systems that extend current 2D target localization capabilities to 3D ones.

A related object of the present invention is to provide an affordable volume-scanning avian radar system capable of localizing bird targets and other targets in three dimensions (latitude, longitude, and altitude).

Another object of the present invention is to provide affordable cylindrical volume coverage and situational awareness of birds in an airspace of interest that extends to 10,000' or more above ground level and to 6 nautical miles or further in range, 360 degrees in all directions.

A further related object of the present invention is to provide the means to affordably upgrade existing 2D avian radar systems so that they can localize bird targets in 3D.

Another related object of the present invention is to maintain or extend all of the user-friendly features of 2D avian radars (e.g. real time display, networking and alerting) to 3D.

Another object of the present invention is to provide the means of producing significantly more accurate target altitude estimates, as compared to conventional 2D avian radars with array antennas, while also increasing overall volume coverage.

A related object of the present invention is to provide the means of producing significantly greater volume coverage, as compared to conventional avian radars employing dish antennas, while not reducing the accuracy of target altitude estimates.

Another object of the present invention is to provide the means of generating images, graphs and tables (avian activity reports) of bird abundance and behavior at various locations within the surveillance volume.

A related object of the present invention is to depict bird altitudes, sizes, concentrations, speeds and heading directions.

A further related object of the present invention is to provide means for filtering the data in order to produce avian activity reports based on both characteristics of bird behavior and on time and place.

A further related object of the present invention is to depict bird abundance and behavior in a geographic framework.

Another related object of the present invention is to provide avian activity reports that clearly and simply present the information needed to support BASH, NRM and UAS sense and avoid requirements.

A further related object of the present invention is to provide the avian activity reports in a timely fashion to support BASH, NRM and UAS sense and avoid requirements.

An important object of the present invention is to integrate the use of real-time track displays and near-term target activity reports to increase situational awareness of hazardous activity in the airspace, support a directed response, and serve as a force multiplier.

A further related object of the present invention is to provide avian activity reports for arbitrary user-specified time intervals in the past.

Another related object of the present invention is to provide the avian activity reports to remote network-accessible end-users.

A related object of the present invention is to provide the avian activity reports as Web pages.

Another object of the present invention is to enable 3D avian radars to distribute their information seamlessly onto radar networks and to remote end-users and to remote integrated tactical (COP) displays.

Another object of the present invention is to provide information (and avian activity reports) suitable for regional, national and continental bird advisory systems.

These and other objects of the invention will be apparent from the drawings and descriptions included herein. It is to be noted that each object of the invention is achieved by at least one embodiment of the invention. However, it is not necessarily the case that every embodiment of the invention meets every object of the invention as discussed herein.

SUMMARY OF THE INVENTION

The present invention recognizes the need for avian radars to scan a 3D surveillance volume for bird (or other airborne) targets. Avian radars need to gather the information from the volume scanning process and present it to avian radar end-users in formats that suit their needs. The aim of the current invention is to provide next-generation avian radars with avian information in a number of useful formats, thereby overcoming limitations in the current state of the art. In so doing, the present invention bridges some of the information gaps (both spatial and temporal) in existing systems so as to improve wildlife managers' ability to evaluate avian activity.

The end-users of avian radars need the information gathered from them organized into formats that they can interpret and act upon. These formats include descriptions of bird activity in various subsets of the volume at different times and time-scales. The present invention incorporates mechanisms that facilitate the conversion of the "conventional" radar data (i.e. the time-evolving target tracks) into more integrated avian activity reports suitable for wildlife managers.

For example, visual point counts taken at one end of a runway may note certain bird species present over at particular times. Visual point counts at another location on the airfield some distance away and at different times may also note birds of the same species. However, it is impossible to confirm that these are the same birds without tagging them. Avian radar, on the other hand, in accordance with the present invention, can continuously monitor the large 3D surveillance volume, track all birds therein, provide 3D localization for them, and generate bird activity reports showing their movement patterns and confirming that these same birds are moving from one location to the other.

Wildlife managers need presentation products that depict the avian activity in a highly intuitive manner. The simplest forms of graphical presentation are abundance charts. Although these can summarize very useful data, they lack the ability to project the behavior of the birds onto a geographic framework. The present invention portrays the information about bird behavior and abundance as color-coded grids or grids of arrows or symbols overlaid onto background maps. Colors and shades best depict scalar quantities like bird density, while arrows are used to depict flowing directional quantities like velocity. With reports in these formats, end-users can interpret avian activity much more effectively.

The end-users of avian radar information are typically not located near the radar sensor nor near the computers that process the sensor data. Distribution of the information over networks (including the World-Wide Web) is of obvious benefit to remote end-users. The present invention is designed to deliver the avian activity reports to many end-users, typically via Web pages, in a timely and convenient manner.

Avian activity reports in accordance with the present invention exploit high-resolution bird-track data recorded over a few minutes to several years worth of data. These reports allow biologists to investigate the spatial and temporal patterns of bird abundance, movements, and deviations from long-term baselines of resident populations, commuting birds, and migrants. With these detailed movements referenced to geographical information systems (GIS), the data can be imported into tools that are familiar to end-users (e.g., ArcGIS) to further investigate abundance and movement patterns. Altitudinal distributions throughout the 3D surveillance volume provide additional information on hazardous bird movements around an airfield.

As will be apparent from the drawings and descriptions herein, the present invention, unlike conventional state-of-the-art avian radars, an avian radar that captures information on bird activity in the majority of a 3D surveillance volume and does not leave significant gaps of situational awareness for wildlife managers.

Conventional avian radars have a very limited three-dimensional (3D) localization capability. The present invention modifies conventional avian radars via custom antenna volume scanning and processing, thereby providing for effective 3D scanning and coverage of a very large surveillance volume and enabling the production of bird activity information about the entire airspace in the vicinity of an aerodrome of interest.

The present invention seeks to overcome the limitations of fixed-elevation azimuth-rotating pencil-beam radars using parabolic or Cassegrain (dish) antennas by providing scanning in the third (elevation) dimension. In particular, means are disclosed herein to provide both greater volume coverage and estimates of altitude within the volume, both of which serve to provide excellent, detailed, bird activity information never before available.

Like certain state-of-the-art radar systems, the present invention is directed to true 3D surveillance. An antenna in one system in accordance with the present invention rotates in azimuth while changing its elevation tilt angle. However, the present invention is low-cost, while military 3D radar systems are orders of magnitude more expensive, because of their phased array antennas. The present invention does not use expensive phased arrays but uses marine radars and PC-based processing to achieve considerable cost reduction, especially as compared to military systems.

The preferred embodiments of present invention do not provide instantaneous coverage of the whole 3D surveillance volume. The radar sensor must spend some time surveying each different sub-volume, and coverage of the entire volume takes a few minutes. In this respect, the present invention is similar to a weather radar. Either a multitude of single-beam radar systems or one with a multiple-beam phased array (or the like) is needed if one desires to get full volume coverage in seconds. In applications of the present invention, full volume coverage in minutes is all that is required to generate hourly activity reports. These are frequent enough to provide situational awareness throughout the airspace in the vicinity of an aerodrome of interest where managers can understand developing hazards and act upon them to improve safety.

Weather radar resolution capabilities (in both time and space) are not suitable for tracking birds. Avian radar applications require a greater resolution and detail than weather radars could provide, to discover behavior of individual birds or flocks, for example, commuting each morning across an active runway to feed and returning at night, so that the resulting hazards can be mitigated. Wildlife managers need to follow tracks converging to roosting sites, for example, so that they can remove hazardous birds. The track interpretation engine of the present invention allows such spatial/temporal behavior patterns to be discovered.

The preferred systems perform detection and tracking, distribute tracks to network, provide real-time displays, and refine target data to user-specific products such as statistical summaries and alerts. They store track data to a database. The differentiators of the present invention are:

- 3D volume scanning systems and methods are disclosed for 3D data sampling of a large 3D surveillance volume and include novel scan patterns that support bird activity situational awareness
- Effective means for providing coverage of cylindrical surveillance volume with a plurality of elevation steps is disclosed
- Novel multi-sensor combinations (e.g. fixed plus agile) are disclosed for effectively and affordably providing coverage and awareness throughout a large 3D surveillance volume
- Avian (or other airborne target) track interpreter is novel and optimally assesses and depicts avian activity in 3D
- Preferred database and optimized processor designs are disclosed for efficiently and cost-effectively organizing detailed track data for 3D sampling and activity report generation
- Novel data products are introduced that derive from the high-resolution, 3D track information
- Present invention is directed towards providing 3D sampling of a large 3D surveillance volume which is complimentary to the real-time monitoring taught in U.S. Pat. No. 7,864,103
- Primary object of U.S. Pat. No. 7,864,103 is to provide altitude information for state-of-art-avian radars; the primary object of the present invention is 3D sampling As used above, "3D sampling" in accordance with the present invention means: i. tracking birds within 3D volumes; ii. assessment of avian activity within 3D volumes; and iii. creation of user-reports that intuitively depict avian activity and behavior within 3D volumes.

The present invention preferably incorporates many features disclosed in U.S. Pat. No. 7,940,206. The present invention distinguishes over U.S. Pat. No. 7,940,206 as follows:

- 3D volume scanning systems and methods—U.S. Pat. No. 7,940,206 only considers 2D surveillance radars including dishes pointed to a fixed elevation angle to compute altitude as target_altitude=target_range*sin(beam_elevation)
- Novel multi-sensor combinations (e.g. fixed plus agile) are disclosed for effectively and affordably providing coverage and awareness throughout a large 3D surveillance volume
- Avian (or other airborne target) track interpreter is novel and optimally assesses and depicts avian activity in 3D
- Special-purpose database(s) organized for 3D sampling
- Novel RDS-GDS (Radar Data Server-Geographic Data Server) design
- Novel data products are introduced that derive from the high-resolution, 3D track information
- Method/System designed to provide 3D sampling as opposed to real-time monitoring
- Primary objects of U.S. Pat. No. 7,940,206 are directed to state-of-the-art avian radar networks, organizing radar target information in an RDS to give users network access to radar data; the primary object of the present invention is 3D sampling It will be obvious to those skilled in the art that the same improvements described herein are applicable to low-cost radars used in other applications such as homeland security. The focus on 3D sampling of birds in this disclosure is in no way intended to limit the scope and application for the invention disclosed herein to birds. Reports on aircraft (including general aviation aircraft and ultralights) activity at various times and time-scales within a surveillance volume will be of great use to intelligence-driven security operations. 3D sampling in accordance with the present invention is also very useful for ground-based sense and avoid (GBSAA) systems that would support unmanned aerial system (UAS) applications. The UAS operator is interested in situational awareness of both birds and GA aircraft in the vicinity of the UAS and the present invention is very well suited to providing such awareness throughout the 3D surveillance volume containing the UAS. Any radar with multiple-target tracking capability could also use the apparatus and methods described herein to provide activity reports in accordance with the present invention. Examples of such radars are described in U.S. Pat. No. 7,940,206.

With the present invention, volume-scanning techniques are applied to avian radar systems in order to provide a means for providing 3D information about detected bird targets throughout a surveillance volume. The present invention provides continuous avian sampling within an upright cylindrical coverage region with the radar at the bottom centre. The present invention not only scans the volume and tracks bird targets within it, but also provides detailed summary reports to end-users about the avian activity within the volume. The invention uses novel scanning methods and data integration methods to produce succinct summaries on the levels of activity of birds within the surveillance volume. The invention operates on the following sequence:

1) Repeatedly scan the volume with radar to obtain 3D tracks of bird targets;
2) Store and organize the information contained in these tracks in a relational database specially-designed for efficient spatial-temporal activity report queries;
3) Periodically and by request query the track database to obtain filtered subsets of the track data; and
4) Process the received data to generate reports that summarize avian activity In accordance with the present invention, a 3D avian radar sampling system has two basic components: a volume scanning radar and an avian track interpretation engine (or avian track interpreter). The volume scanning radar preferably rotates its antenna (via a scanner) about two axes; this allows the antenna pointing direction to vary in both azimuth and elevation. The volume scanning radar preferably includes a state-of-the-art radar transmitter and receiver, and a custom digital processor configured for detecting and localizing airborne targets in azimuth, elevation and range and preferably transforming those to earth coordinates, namely, latitude, longitude and altitude or other earth coordinates known to those skilled in the art. The avian track interpretation engine receives the tracks from the volume scanning radar, and reorganizes the information contained within them into avian activity reports suitable for visualization and interpretation by end-users. The engine preferably includes a track database that stores the tracks for subsequent querying by an illustrator application or processor, which creates the reports.

A related method of sampling the abundance and behavior of birds within a 3D surveillance volume is to operate a radar system to successively illuminate, detect and track the targets within sub-volumes of the complete volume. These sub-volumes are preferably slices that can be illuminated by varying a pointing angle of the radar antenna. While the volume is being interrogated, the information about the bird targets tracked within each sub-volume is collected and organized. At some later time, using this information, reports are created that convey the bird abundance and behavior within the 3D volume.

The first part of the present invention concerns practical improvements over state-of-the-art 2D avian radar systems, including improvements in antenna designs and related and necessary radar transceiver modifications. The improvements include the following features:
   3D cylindrical volume coverage
   Improved altitude estimation within the covered volume
   Inexpensive and incremental augmentation of current systems
   Low sidelobe response at ground level (zero elevation)
   Narrow-beam azimuth and elevation response In accordance with the first part of the present invention, the following general radar system designs provide (to varying degrees) the desired features listed above:
1. A radar system with a pencil beam that slowly scans up and down in elevation, while rotating rapidly in azimuth.
2. A radar system with a pencil beam that slowly rotates in azimuth, while rotating rapidly in elevation.
3. Two or more 2D azimuth-rotating pencil-beam radar systems operating side-by-side at different fixed elevation angles.
4. Two or more 2D elevation-rotating pencil-beam radar systems operating side-by-side at different fixed azimuth angles.
5. A radar system with one or more 2D azimuth-rotating pencil-beam radar systems operating side-by-side with one or more 2D elevation-rotating pencil-beam radar systems.
6. A radar system with two or more vertically-stacked pencil beams that rotates in azimuth.
7. A radar system with two or more horizontally-displaced pencil beams that rotates in elevation.
8. Any of the above systems with fan beams instead of pencil beams.

Systems 1 and 2 above (referred to herein as dual-axis scanning radars) will not get instantaneous volume coverage, but will get full volume coverage over time. Systems 3, 4 and 5 above are costlier in terms of hardware and real estate, more difficult to integrate, and require more than 2 radars to cover the full cylindrical volume. Systems 6 and 7 are costlier still, and also need more than 2 beams for full coverage. Systems with fan beams (8) suffer from poor spatial resolution in the dimension of their fan extent. System 1 is preferred because it matches the coverage volume better than 2, and allows the tracking of level-flying birds (and aircraft) with all possible headings.

A preferred form of the first part of the present invention is the slow-elevation-scanning system (1 above). The radar typically samples the volume using a (quasi) helical scan, where the antenna rotates rapidly in azimuth while slowly nodding (or stepping) in elevation. Nodding is preferably by mechanical means because of lower cost, but electronic means (including frequency-scanning and phased-array implementations) are within the scope of the present invention. Nodding is slow enough that targets remain within the beam for several consecutive scans, long enough to form tracks. The apparatus must be able to control nodding while rotating in azimuth. It utilizes a scanning mechanism that provides the antenna with two axes of rotation. Elevation coverage is not obtained instantaneously (i.e. within the few seconds it takes for one azimuth rotation), but over periods of a few minutes.

The slow-elevation-scanning system cannot detect every bird in the surveillance volume. Rather, it samples the hourly, daily, or seasonal activity (in this respect, it is like a weather radar). This system has some key advantages over other solutions:
   It is more flexible in the choice of coverage region (e.g. could look between 5° and 10° elevations during day, between 10° and 20° at night).
   It is typically a much simpler increment to currently existing solutions:
   The antenna is a conventional dish, no modifications to the receiver and A/D system are required, and
   the changes to the processing are confined to the interpretation of the track data.

In order to accurately locate the tracked targets, the processor needs to be kept informed of the antenna azimuth (Az) and elevation (El) positions (via signals from the scanner). The processor preferably controls elevation according to operator-set parameters.

The antenna beam response is preferably that of a pencil beam. However, the azimuth beamwidth need not equal the elevation beamwidth, and elliptical beams or fan beams may be favored in certain applications. The beam preferably has reasonably low largest sidelobes (preferably below −20 dB). A preferred embodiment of a pencil-beam antenna in accordance with the present invention is a dish reflector antenna with a central feed. Either reflectors with offset feed designs or flat-plate antennas may be preferred for achieving lower sidelobes (by eliminating feed blockage).

The antenna preferably rotates continuously 360° in azimuth at preferably at-least 24 revolutions per minute (RPM) while transmitting and receiving. It may be desirable to have a selectable rotation rate. The rotating antenna is typically mounted near ground level; it could be on the roof of a trailer or a small building, or it could have its own dedicated structure. Some sites may require the antenna to be raised to 10 feet or so above ground in order to clear nearby obstructions. The rotating antenna is usually protected from (or immune to) the environment (wind, rain, dirt, etc.); any protective measures (such as radomes) should not significantly distort beam patterns nor raise sidelobes above tolerable levels. The rotating antenna boresight must be (mostly) unobstructed from mechanical apparatus; some applications may tolerate an obstructed azimuth sector.

The antenna preferably rotates more slowly in elevation so that different conical slices (sub-volumes) are illuminated by the radar continuously for many azimuth rotations. This allows targets within a given slice to be tracked long enough to achieve reliable position and velocity estimates. After one slice has its turn, the antenna moves to another elevation, and another slice is illuminated. The whole cylindrical volume (possibly minus a small cone directly overhead of the radar) is sampled in the time it takes the antenna to move in elevation from its lowest to its highest settings (or vice-versa). Of course a hemi-spherical volume could be used in place of a cylindrical one.

The present invention preferably uses a custom-designed elevation scanning apparatus preferably fitted to a COTS radar transceiver and (azimuth) scanner and antenna (although using a custom-built radar transceiver to facilitate integration still falls in the spirit of this invention). The elevation scanning apparatus consists of a servo-controlled motor that can tilt the antenna to a specified angle and a waveguide joint that permits RF energy to propagate to and from the antenna at different elevation angles. The waveguide joint can employ a flexible waveguide. An azimuth rotary joint with a slip ring connection provides a path for RF, power for the motor (preferably a high-quality stepper motor), and elevation control signals while the motor, elevation waveguide joint and antenna rotate in azimuth. An elevation feedback signal may also be provided back down to the processor. A wireless connection, a battery, and/or some other state-of-the-art schemes, could alternatively provide RF, power and/or control to the motor, thereby obviating the need for a specialized rotary joint. The antenna is preferably a dish antenna in accordance with the invention.

An alternate scanning apparatus could use a COTS radar transceiver and (azimuth) scanner operating on its side so its beam scans the vertical plane. Rather than adding a second dimension of rotation to the scanner, the entirety can be placed on a turntable that rotates in the horizontal plane slowly to provide 360° coverage. The antennas that could be used include a dish or an array.

A preferred embodiment is to have the scanning pattern programmable in software and changeable by the user according to sampling requirements. Some applications would prefer to have the entire volume scanned at a rapid rate (e.g. 15 min or less) with only short-duration tracks formed at each elevation step. Others would prefer longer-duration tracks, and thus tolerate slower volume scanning rates (e.g. up to 2 hours). Non-linear and non-monotonic scan patterns are also possible.

A second form of the first part of the present invention, which is an alternative to the dual-axis scanning system described above, involves using two (or more) independent avian radar systems operating side-by-side with their respective antennas set at different fixed elevation angles. Each avian radar tracks targets within its respective coverage volume slice, using its own receiver and processor. Track data from each radar are combined in the avian track interpretation engine. The engine may use fusion processing methods know to those skilled in the art.

In accordance with the present invention, the volume-scanning radars are preferably customized avian radars and the 3D avian radar sampling systems preferably exploit components and architectures associated with avian radar networks. Avian radars and networks are known to those skilled in the art, and are described in the following: *Could Avian Radar have Prevented US Airways Flight* 1549*'s Bird Strike?*, Nohara, T J, 2009 Bird Strike North American Conference, Sep. 14-17, 2009, Victoria, B. C., *Reducing Bird Strikes—New Radar Networks can help make Skies Safer*, Nohara, T J, Journal of Air Traffic Control, Vol 51, No. 3, Summer 2009, pages 25 to 32, *Affordable Avian Radar Surveillance Systems for Natural Resource Management and BASH Applications*, Nohara, T J et al, 2005 IEEE International Radar Conference, May 9-12, 2005, Arlington, Va., and US, U.S. Pat. No. 7,940,206 entitled "Low-cost, high-performance radar networks", and U.S. Pat. No. 7,864,103 entitled "Device and method for 3D height finding radar", all of which are incorporated herein by reference.

Regardless of the form of the first part of the present invention, the radar processor detects and tracks bird targets. Target tracking preferably uses state-of-the-art multi-target tracking algorithms known to those skilled in the art such as those detection and tracking algorithms described in U.S. Pat. No. 7,940,206 Low-cost, High-performance Radar Networks, incorporated herein by reference. A multi-target tracker facilitates target track association and allows for smoothing and improved estimation of the target position and dynamics.

The second part of the present invention is the avian track interpretation engine which concerns the organization and presentation of track data so as to provide summary reports of bird activity over various time scales, including hourly, daily, weekly, monthly and yearly. Avian activity reports take the form of tables, graphs and images or any collection of these that illustrate the bird abundance and behavior during certain time intervals at certain locations. In particular, the activity reports summarize statistics about those birds with user-specified attributes at these intervals and locations. Both the statistics and the specified attributes can include any information that can be derived from the track data, such as speed, heading, radar cross-section (RCS), track duration, track density, altitude, as well as abundance. An example avian activity report could be an hourly plot of the number of birds with cross sections greater than −15 $dBm^2$ within the departure corridor of a given runway, or the distribution of such birds across an entire airfield, on a spatial grid of say 200 m by 200 m cells.

To begin the organization process, the tracks from the avian radars are preferably written to a track database as soon as they are created. This database is queried by an activity illustrator application or processing engine for specified records whenever an activity report is to be generated. Activity reports are generated on regular time intervals, or upon request from an operator. The track database is preferably a state-of-the-art relational, SQL database which specially designed schemas that organizes the data so that it can be efficiently queried at the same time as the new track data are (continually) being stored. The track database is preferably a component of a Radar Data Server (RDS), which performs the functions of receiving target data (including track data, detection data, alerts and meta data) from various radars, storing the data in the track database, and serving the target data to various users and applications.

The RDS records all processed target track data on a scan-by-scan basis, that is, it is organized based on a timestamp that increments on every scan by the radar antenna's azimuth rotational period. This creates an organization that is time-based, which is well suited for recording, live network distribution of data, and simulated real-time playback of target tracks. However, a time-based organization is not well suited to geographical and geometric analysis of target tracks. A target track will typically exist for many scan intervals, representing a single object in space and time with a number of measurable attributes (e.g. velocity, radar cross section, heading, altitude etc.). A geographic information system (GIS) database-friendly organization of the data is required in order to be able to be able to make efficient queries on a track, rather than purely a time, basis. One example of a track-object oriented GIS query is: "How many individual track objects (i.e. birds or flocks) were present in a polygonal coverage area over the last 24 hours that had an average velocity less than 10 m/s and an altitude less than 500 feet AGL?"

The geographic or geographical data server (GDS), which is also preferably a state-of-the-art relational database with GIS extensions/plugins known to those skilled in the art) in accordance with the current invention performs a real-time, on-the-fly, re-organization of the scan-by-scan track data into GIS-friendly track-oriented entries. Each track entry that is created preferably contains a globally unique track ID that identifies the track over all time and all radars, a LINESTRING-type GIS object that contains the target's location in 3D space and time over the life of the track (i.e. its trajectory), and summary statistics of the track attributes computed over the life of the track that give average, median, minimum, maximum, and other statistics that in turn make it possible to perform coarse filtering of tracks efficiently and rapidly. This organization allows a user to display filtered track histories or perform further computations on a track-by-track basis. This also allows users to combine GIS track information from multiple radars into a single database for further analysis.

Other GIS-enabled tables within the GDS contain information about the deployment area coverage, the radar site locations within the deployment area, and the DRPs deployed at each site.

The avian track interpretation engine preferably processes both regular standard and occasional user-specific requests for activity reports. Based on the specifics of a given request, the interpreter first queries the track database for the appropriate records. It then processes the obtained data and creates the graphs, images, tables and text that constitute the avian activity report. The activity reports are distributed to end-users via state-of-the-art methods, with near-term activity reports preferably generated at least a few times per hour to provide increased and on-going situational awareness of the current situation. One of these methods is to provide flexible access via Web pages over the Internet, accessible in the Cloud by remote computers and mobile devices. The combination of using near-term activity reports to highlight developing hazardous situations coupled with real-time track displays to locate and direct responses to particular hazardous birds is a novel, tactical feature of the present invention. More distant (older) activity reports are used to investigate whether a developing hazardous situation is a repeating occurrence or pattern allowing more strategic actions to be taken.

The present invention employs state-of-the-art techniques for portraying multi-dimensional information that are used in other fields. For example, weather radar services provide diagrams where color-coded grids are overlaid onto background maps, the colors depicting the intensity of precipitation at the overlaid location. For avian applications, this form of presentation is useful for depicting scalar quantities like bird density, as well as statistics of other quantities such as mean bird altitude, median bird speed, etc. Contours are also useful for depicting these same quantities, but are not as intuitive to many end-users. Another form of presentation overlays a grid of arrows onto a background map. This form is better for depicting flowing directional quantities like velocity and heading. The lengths, thicknesses and colors of the individual arrows encode location-dependent information such as mean speed, number of birds, etc. These diagrams depict the moving aspects of the bird behavior, e.g. the birds are travelling from this location to that, as opposed to the more static aspects, e.g. how many birds of a certain size were at this location.

3D sampling and the generation of timely avian activity reports in accordance with the present invention compliment real-time track displays to dramatically increase situational awareness, giving early warning to operators of developing hazards that become persistent for a period of time. Such activity reports can be simply glanced at to understand and appreciate that a new hazardous situation has started to develop and is increasing risk at a particular location in the surveillance volume. If a bird strike is reported, for example, a quick glance at the activity report can indicate whether this was an isolated incident, or whether a persistent situation is underway, such as a significant movement of migrants that is occurring in the same air space used by active runways. As operators are busy with many functions, not having to stare at avian radar displays is a significant force multiplier. With a glance, operators can issue warnings to pilots, as well as notify air operations personnel to help mitigate the risk, for example by driving out to the location in question and harassing the birds to alter their flight path and leave the airspace. Conventional real-time track displays can be used by response personnel to locate the birds in need of harassing. A quick review of activity reports for the same time-of-day in the recent past (i.e. recent days or weeks) can indicate whether a recurring movement is underway and can result in a notice to airmen (NOTAM). In subsequent years, the prior activity reports can support strategic actions such as planning and development of predictive models for the same activity. Year-over-year activity reports provide metrics to managers responsible for enhancing safety.

DEFINITIONS

Figure 1:
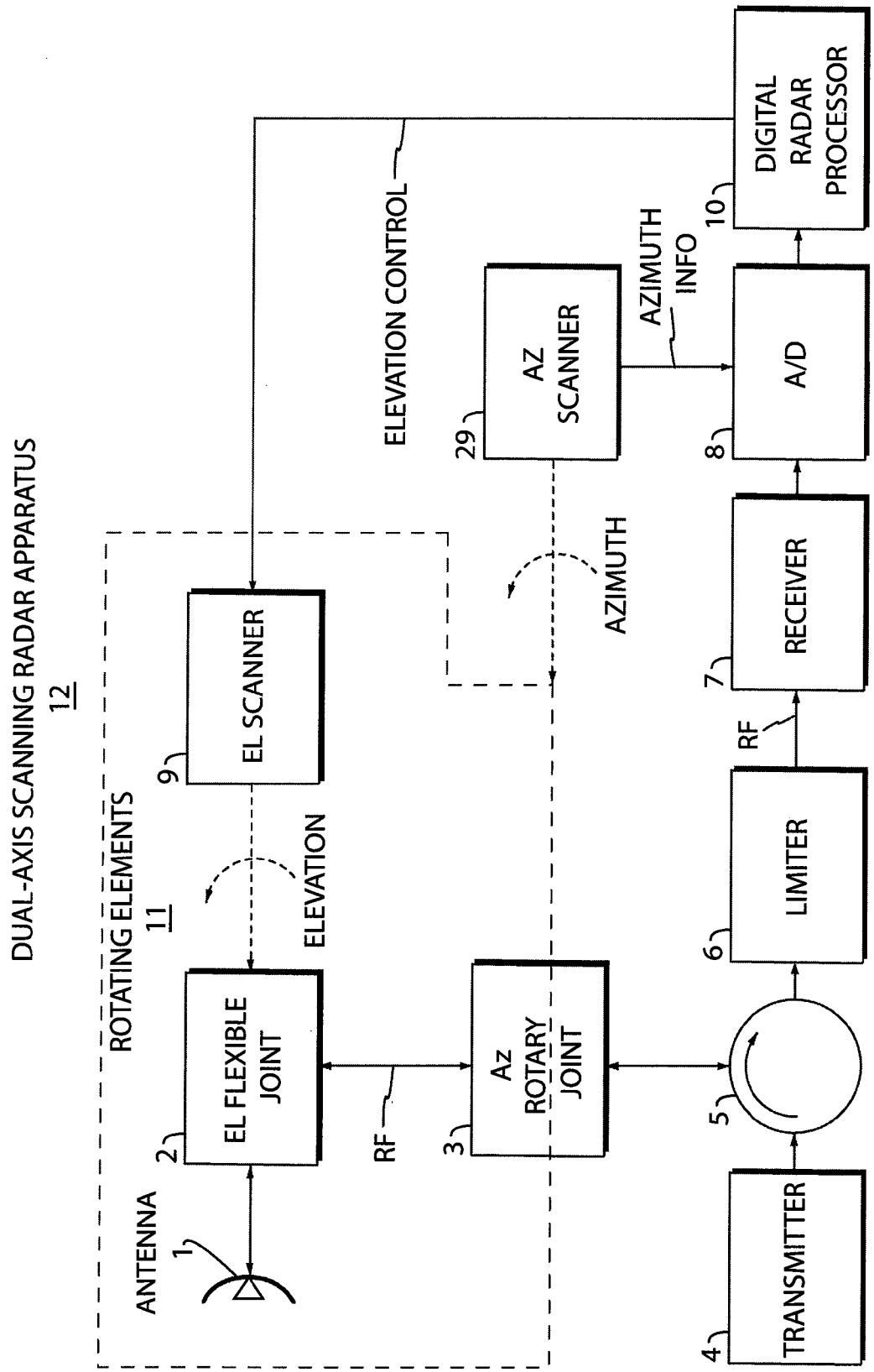
FIG. 1 is a block diagram of a dual-axis scanning avian radar apparatus in accordance with the first part of the present invention.

The terms "volume-scanning radar device," "volume-scanning radar system," "3D scanning radar device," and "3D scanning radar system" are used herein to denote a type of radar apparatus with a structure and associated scanning protocol that produces a periodic sampling of a large volume such as a cylindrical area of 20 kilometers in diameter and 10,000 feet in altitude. Such a volume-scanning radar apparatus enables, for instance, the tracking of significant numbers of birds about an airport, an oil sands area, a conservation preserve, etc. A volumetric scan pursuant to the invention may be achieved by executing multiple scans along one coordinate direction for each single scan along another coordinate direction. For instance, multiple azimuthal scans may be carried out for each single elevational pass.

Concomitantly, the term "3D volume" is used herein to denote volume on the order of kilometers or more in diameter or width and thousands of feet or more in height. A 3D volume typically defines the airspace about a facility of importance, such as an airport, a nuclear or other power plant, a dam, an oil field, a marine terminal, etc.

The term "track database" is used herein to denote a database that stores temporal and spatial information about detected targets. A track database as that term is used herein is a key part of a radar data server and a geographical data server. As used herein, a radar data server and a geographic data server may each have their own track database, or they may share parts of a common database. The context will indicate whether the term track database refers to that specific part of the radar data server or geographic data server, or the combined target database.

The term "radar data server" is used herein to denote a server computer in a networked radar system that organizes and stores time-ordered track data pertaining to multiple target objects in a surveillance volume over an extended period of time. A radar data server, as that term is used herein, enables the efficient provision in real-time and for historical access of track data pertaining to the multiple target objects in a time-ordered manner. A radar data server is preferably connected to a geographical data server and to multiple users via an interface and a computer network. A radar data server (RDS) thus performs functions of receiving target data (including track data, detection data, alerts and meta data) from various radars, storing the data in the track database, and serving the target data to various users and applications. A radar data server may be a single device serving an entire network of 3D-volume-scanning radars or may each represent a respective plurality of respective track data processing devices where each such device serves a particular one or more of 3D-volume-scanning radars.

The term "geographical data server" is used herein to denote a database, preferably with data processing capability (hence "server"), that processes radar time-ordered track data, for instance, from a radar data server, to generate target-object data which include trajectory-ordered track data pertaining to respective target objects. The target-object data is spatial in that the trajectories extend in space with the time element either eliminated or reduced to secondary status, e.g., by indexing. The target-object data preferably includes other types of information, such as direction, speed, velocity (direction and speed), target cross-section (RCS), altitude, etc., in statistical attribute format in easy-to-search indexed or tabular form. A geographical data server may be a single device serving an entire network of 3D-volume-scanning radars or may each represent a respective plurality of respective track data processing devices where each such device serves a particular one or more of 3D-volume-scanning radars.

One use of the term "target" herein is to denote an object of interest that is capable of being detected and tracked via a radar tracking system. An alternative use of the term "target" denotes an object in the form of a collection of radar data as stored in memory that includes all of the location updates of an associated track in a single structure upon which geographical calculations can be easily carried out.

The term "on the fly" as used herein denotes in part a continual processing of radar track data to organize and reorganize that data into time-ordered track data (in a radar data server) and into spatial-ordered track data (in a geographical data server). The term "on the fly" refers to radar data processing operations that occur automatically and continuously, rather than sporadically and only in response to user requests. The time-ordered and spatial-ordered track data are stored in a track database as the organized and reorganized data is generated, thereby making that track data available on a continuing updating basis to various individual users and software applications. The organizing of the track data may extend to the computing of various statistics pertaining to different target-characterizing parameters such as position, altitude, speed, direction, velocity (speed and direction), radar cross-section (RCS), etc. The spatially ordered track data includes trajectories, that is, complete descriptions of target movement. The organizing of the track data may further extend to the computing of various statistics pertaining to target objects and their associated trajectories. The on-the-fly processing of radar data acquired during a scan of a radar volume slice may occur during the acquisition of radar data from a next volume slice scan.

The term "target analytics processor" (TAP) as used herein denotes a processor configured at least in part to selectively access temporally and spatially ordered track data (e.g., in a radar data server and a geographical data server, respectively) in order to respond to a query from a user for specialized radar information or alternatively to further process and organize the track data, for instance, into statistical measures for facilitating responses to future inquiries from users. Thus, the target analytics processor analyzes accessed track data to further organize and process that data on the fly or in response to user requests and to generate activity reports which may be published on a Web server for Intranet or Internet access by users. The TAP may include Web server functions as well. A target analytics processor may be a single device serving an entire network of 3D-volume-scanning radars or may each represent a respective plurality of respective track data processing devices where each such device serves a particular one or more of 3D-volume-scanning radars.

An "avian activity illustrator" or, more generally, "airborne-target activity illustrator" as that term is used herein refers to a software-configured computer or processor that, in response to user requests, accesses a track database and analyzes track data to create requested target activity reports. The activity illustrator may include Web server functionality for delivering the generated activity reports to the requesting users, preferably over a network connection. An activity illustrator may be an included portion of a target analytics processor. The latter includes additional functionality, for instance, for computing statistical values for target-characterizing parameters, independently of any specific current user requests but in anticipation of eventual need.

The terms "avian track interpretation engine" and "avian track interpreter" and, more generally, "airborne-target track interpretation engine" and "airborne-target track interpreter" are used herein to refer to the interconnected combination of an avian or airborne-target activity illustrator, a track database (including both time-ordered and spatial-ordered radar track data), and a user interface and control. The user interface and control fields incoming queries and requests for selected radar data from individual users and user applications programs. The track database of a track interpretation engine or track interpreter may include processing functionality, specifically as part of a radar data server that generates temporally ordered track data and a geographical data server that generates spatially ordered track data.

The terms "spatial-ordered data" and "spatially ordered information" and variations thereof are used herein to denote the structuring of radar data in a radar database in accordance with trajectories of target objects. Thus, information is coded or organized by track trajectory or target object so that a spatially ordered database rapidly yields the trajectories or cumulative successive locations of individual tracked objects. This spatially ordered information facilitates and expedites correlation of tracked objects or targets with predefined geographic regions or spatial grid areas. Spatially ordered data may include time markers, e.g., via indexing, that facilitate correlation with time-ordered data in a temporal database. A geographic data server (GDS) reorganizes scan-by-scan track data on the fly, into GIS-friendly track-oriented entries. Each track entry that is created preferably contains a globally unique track ID that identifies the track over all time and all radars, and a LINESTRING-type GIS object that contains the target's location in 3D space and time over the life of the track (i.e. its trajectory).

The terms "time-ordered data" and "temporally ordered information" and variations thereof are used herein to denote the structuring of radar data in a radar database in accordance with the times of the collection of the radar data. A temporally ordered database thus rapidly yields target parameters (location, speed, direction, velocity, radar cross-section) of the group of tracked objects detected together as a function of time. This temporally ordered information facilitates and expedites real-time awareness as well as correlation of tracked objects or targets with daily and seasonal times. Temporally ordered data may include space markers, e.g., via indexing, that facilitate correlation with spatial-ordered data in a spatially ordered database. As disclosed herein, a radar data server records all processed target track data on a scan-by-scan basis, that is, it is organized based on timestamps that increment on every scan by the radar antenna's azimuth rotational period. This creates a time-based organization of radar data.

The word "priority" in a term such as "priority coverage" or "priority sub-volume" is used herein to denote a sub-volume of a 3D volume that is designated as of higher importance for radar scanning purposes. A priority zone might be, for example, an airport take-off and landing corridor, or a known bird migration route over an oil field or conservation site. A radar installation capable of monitoring a 3D volume about a sensitive facility may be operated to concentrate radar detection on a priority zone without totally ignoring other parts of the 3D volume.

DETAILED DESCRIPTION

A block diagram of a dual-axis scanning avian radar apparatus 12 in accordance with the first part of the present invention is shown in FIG. 1. Characteristics of each block are as follows. The dual-axis scanning avian radar apparatus 12 includes a radar transmitter 4 that can be of the noncoherent or coherent type, and transmits pulses typically of constant width at a constant pulse repetition frequency (PRF) at X-band or S-Band (or other bands). Radar apparatus 12 has a dual-axis scanning antenna 1. Antenna 1 is typically mounted near ground level within (or near) the area to be monitored.

The Az-scanner 29 and El-scanner 9 move the antenna 1 through its (typically) helical scan path using an Az-scan motor and an El-scan motor. The El (Elevation) flexible joint 2 and Az (Azimuth) rotary joint 3 allow RF transmission and reception while scanning on both axes. The circulator 5, limiter 6 and receiver 7 are conventional radar components such as those found in marine radar transceivers. The analog to digital (A/D) converter 8 digitizes the radar return video signal. The Az-rotary joint 3 which includes a slip ring connection provides a path for RF, power and control for the El-scan motor, while the antenna 1, El flexible joint 2 and El-scan motor rotate in azimuth. The El flexible joint could also be of a rotary joint type.

Figure 2:
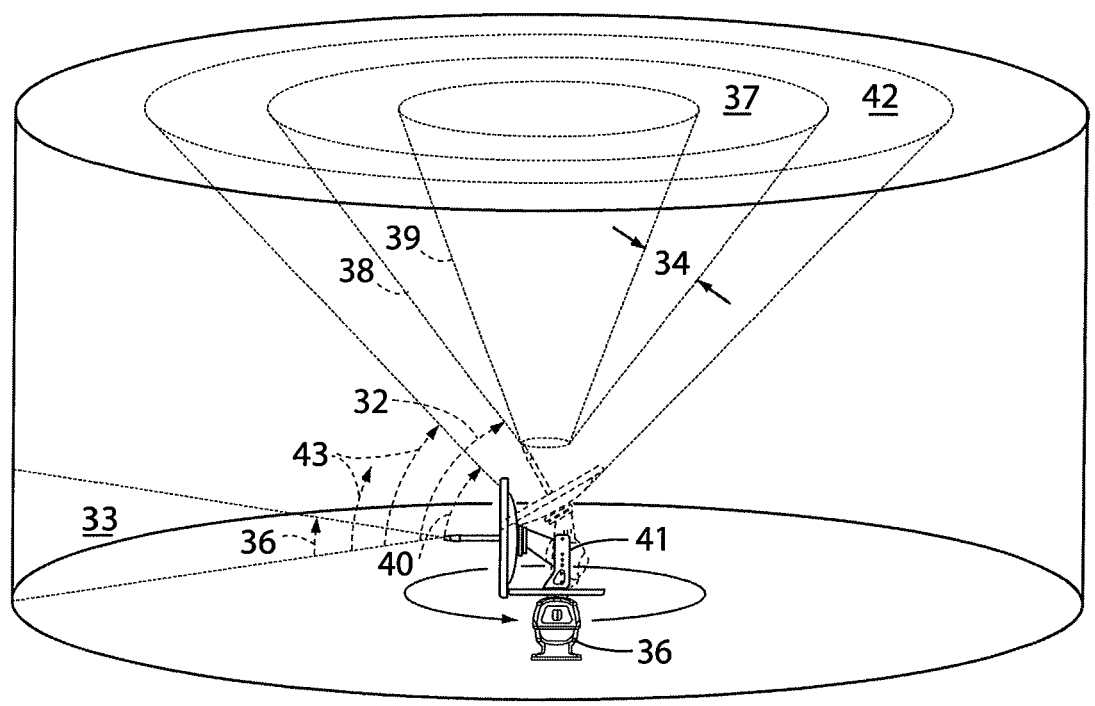
FIG. 2 illustrates a cylindrical volume scanning method and dual-axis scanning apparatus in accordance with the present invention.

A preferred cylindrical volume-scanning method with dual-axis scanning apparatus is illustrated in FIG. 2, using a dual-axis scanning radar in accordance with the current invention. A volume scan is carried out by successively scanning the beam 33 about the azimuth axis, while stepping through a number of elevation angles, the collection of conical sub-volumes making up the required 3D surveillance volume. The scan pattern is repeated after the beam 33 steps through the collection elevation angles that make up the scan pattern, so that the entire volume scan repeats continuously. The time taken to complete a single volume scan is the volume scan period and volume scan revisit time.

At each elevation angle 32, the beam 33 covers an elevation swath 34 of width equal to the antenna's beamwidth 35 centered at the angle 32. By rotating about the azimuth axis 36, the antenna illuminates a solid of revolution 37 that is the volume between two cones 38 and 39. If the antenna is then tilted by the El-scan motor to a lower elevation angle 40 by rotation about the elevation axis 41, then the solid of revolution 42 is illuminated. By successively illuminating at other elevation angles, 43, the entire cylinder is eventually covered by the scan pattern. The cylindrical volume meets typical end-user requirements for coverage of airborne targets: from zero to a specified ground range R (e.g. R=10 km) and from 0 to a specified altitude H (e.g. H=10,000 ft) AGL.

With the volume-scanning method shown in FIG. 2, illumination at high elevation angles (e.g. greater than 60 degrees) is not particularly useful and can be dispensed with in preferred embodiments in accordance with this invention. This is because once the beam hits the top of the cylinder, the volume of a given solid of revolution rapidly decreases with increasing elevation. A beam pointed at 30 degrees illuminates a volume 4.7 times as large as one at 50 degrees and 16 times as large as one at 70 degrees. Thus there are rapidly diminishing returns in coverage volume versus scanning time at higher angles. Not illuminating the high elevations allows relatively short volume revisits (e.g. 10 minutes) while tracking nearly the full complement of birds for use in activity reports (due to the fact that the missing volume is a small percentage of the total volume coverage). It is then possible to generate hourly volume activity reports that update every 10 or 15 minutes. Hourly reporting is important for tactical use at airports where wildlife control personnel can be dispatched to locations of significant activity in order to disperse birds, reducing hazards and increasing safety. A preferred volume scanning method embodiment for efficient 3D sampling only scans up to a middle elevation (e.g. 45 degrees), and sacrifices the small cone above the radar. The ratio of the volume of this small cone (a 45 deg cone has a radius r=H, and volume=pi/$3(r^2)$H) to the entire cylindrical volume (volume=pi$(R^2)$H) can be shown to be $\frac{1}{3}(H/R)^2$. For H=10,000' and R=10 km, this translates to leaving out of the cylinder just 3% of the volume!

A second reason for not using high-elevation angles is that horizontally moving targets such as birds and aircraft do not remain in the (high-elevation) sub-volume for long durations, since the horizontal width of the solid of revolution also rapidly decreases with increasing elevation. This property is easily seen in FIG. 2 where beam 33 which has an elevation angle equal to 0 deg (i.e. pointed horizontally) has a horizontal width equal to the radius of the cylinder. On the other hand, solid of revolution 37 has a much smaller horizontal width. When the elevation angle equals 90 deg, the horizontal width is the smallest and is simply equal to the physical extent spanned by the antenna beamwidth 35.

A preferred embodiment of the present invention allows the volume scan pattern to be set in software by the operator, and then directed by the DRP 10. Feedback may be provided to the DRP after the antenna 1 has tilted to a requested angle. Arbitrary volume scan patterns can be used, including those that step up or down through a monotonic set of elevation angles (this minimizes the revisit time for a particular beam elevation), or up and down through a set of elevation angles (this minimizes jumps between successive elevations to enhance track continuity), before the scan pattern repeats.

Any number of elevation angles can be specified in the volume scan pattern, with arbitrary spacing between each elevation, and an arbitrary amount of time at each elevation, preferably specified in terms of number of azimuth scans, spent at each elevation.

In accordance with a feature of the present invention, scan patterns can be tailored for targets of interest by matching the scan pattern to their expected location and dynamics. For example, fast targets at shorter ranges approaching the radar will be seen by the radar to have a fast increasing elevation rate, whereas the same targets moving away from the radar will have a decreasing elevation rate. At further ranges, the elevation rate decreases. The scan pattern can be matched to the expected targets of interest to ensure that the 3D sampling of the specified surveillance volume results in the highest probability of tracking particular targets of interest.

In accordance with another feature of the present invention, the operator can select a target track of interest generated by DRP 10, causing the repeating volume scan pattern to be interrupted, while the dual-axis scanning radar apparatus 12 points to the selected target. The target of interest will then be illuminated by the radar. Illumination of the target of interest can be indefinite, or for a finite time, after which the volume scan pattern resumes. In addition, since the DRP 10 is tracking the target of interest, a target follower-mode can be effected by the DRP 10 providing elevation control to the El scanner 9 directly based on the estimated elevation angle of the target of interest. Another preferred embodiment of the present invention has another source external to the dual-axis scanning radar apparatus 12 provide the scan pattern elevation angles on-the-fly. For example, in UAS applications, the on-board GPS location of the unmanned aerial system is continuously communicated to the ground-based pilot/controller who is flying the UAS, so that the UAS location is always known. A preferred embodiment of the current invention has the UAS GPS updates sent to and used by DRP 10 to provide elevation control to the El Scanner 9. This allows the dual-axis scanning radar apparatus 12 to follow the UAS, providing a continuous, protective surveillance volume around the UAS itself. All general aviation aircraft and birds that may potentially come into conflict with the UAS will be illuminated by the continuously adjusted solid of revolution that follows the UAS and hence tracked by the dual-axis scanning radar apparatus 12. This UAS-follower mode is affordable and ideal for a ground-based sense and avoid capability in support of UAS operations.

DRP 10 preferably tags all detections in real-time with current elevation angle information so that detections and tracks can be represented in 3D radar coordinates (range, azimuth, elevation) and transformed to earth coordinates (lat, lon, altitude or equivalent).

Figure 3:
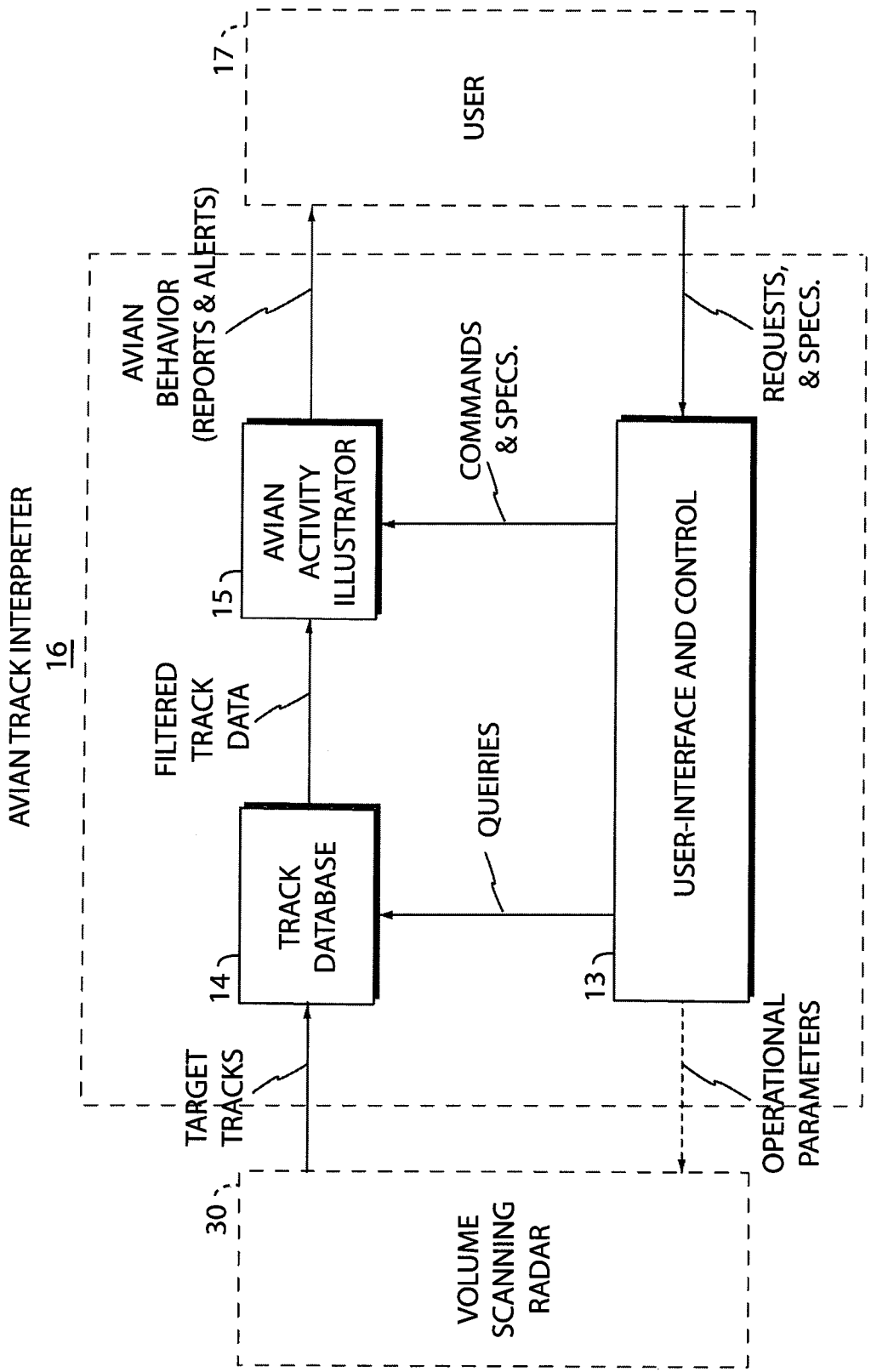
FIG. 3 is a block diagram of an Avian Track Interpretation apparatus in accordance with the second part of the present invention.

A block diagram of an Avian Track Interpretation apparatus 16 (also referred to as avian track interpreter or interpretation engine) in accordance with the second part of the present invention is shown in FIG. 3. Characteristics of each block are as follows. The Track Database 14 internally stores target track information it receives from the Volume Scanning Radar apparatus 30 preferably over a network connection. The Volume Scanning Radar apparatus 30 is preferably a dual-axis scanning apparatus 12 but can be any scanning apparatus that supports 3D sampling in accordance with the present invention. Dual-axis scanning apparatus 12 can be used anywhere for Volume Scanning Radar apparatus 30 herein. The User-Interface and Control module 13 receives and processes User 17 requests and specifications for avian activity reports. It also converts these requests into queries for the Track Database 14 and into commands and specifications for the Avian Activity Illustrator 15. In response to the queries, the Track Database 14 delivers filtered subsets of the track data appropriate for the generation of the specified activity reports. The Avian Activity Illustrator 15 analyzes the obtained track data and creates the requested reports according to specifications provided through the User-Interface and Control module 13 and delivers them to the User 17 preferably over a network connection.

Certain Users 17 may preferably have privileges to request that the user interface and Control module 13 set the operational scanning mode of the Radar 30 (or 12), as well as the operating mode of the Avian Track Interpreter 16. As described earlier, the Radar 12 can be set into continuous volume scanning mode whereby it repeats a defined 3D volume scan pattern over and over again. Alternatively, it can be commanded to illuminate a particular target of interest and even to follow a target of interest by updating its beam position to keep the target of interest illuminated. In accordance with the present invention, the Avian Track Interpreter 16 can generate an avian activity report in an interactive fashion by user command. It can also continuously generate hourly, daily, weekly, monthly, or yearly activity reports on-the-fly, preferably publishing the same on a web server (which preferably is part of the Avian Activity Illustrator 15) so users can simply click to a web-page of interest, and can easily refer back to previously published reports.

Figure 4:
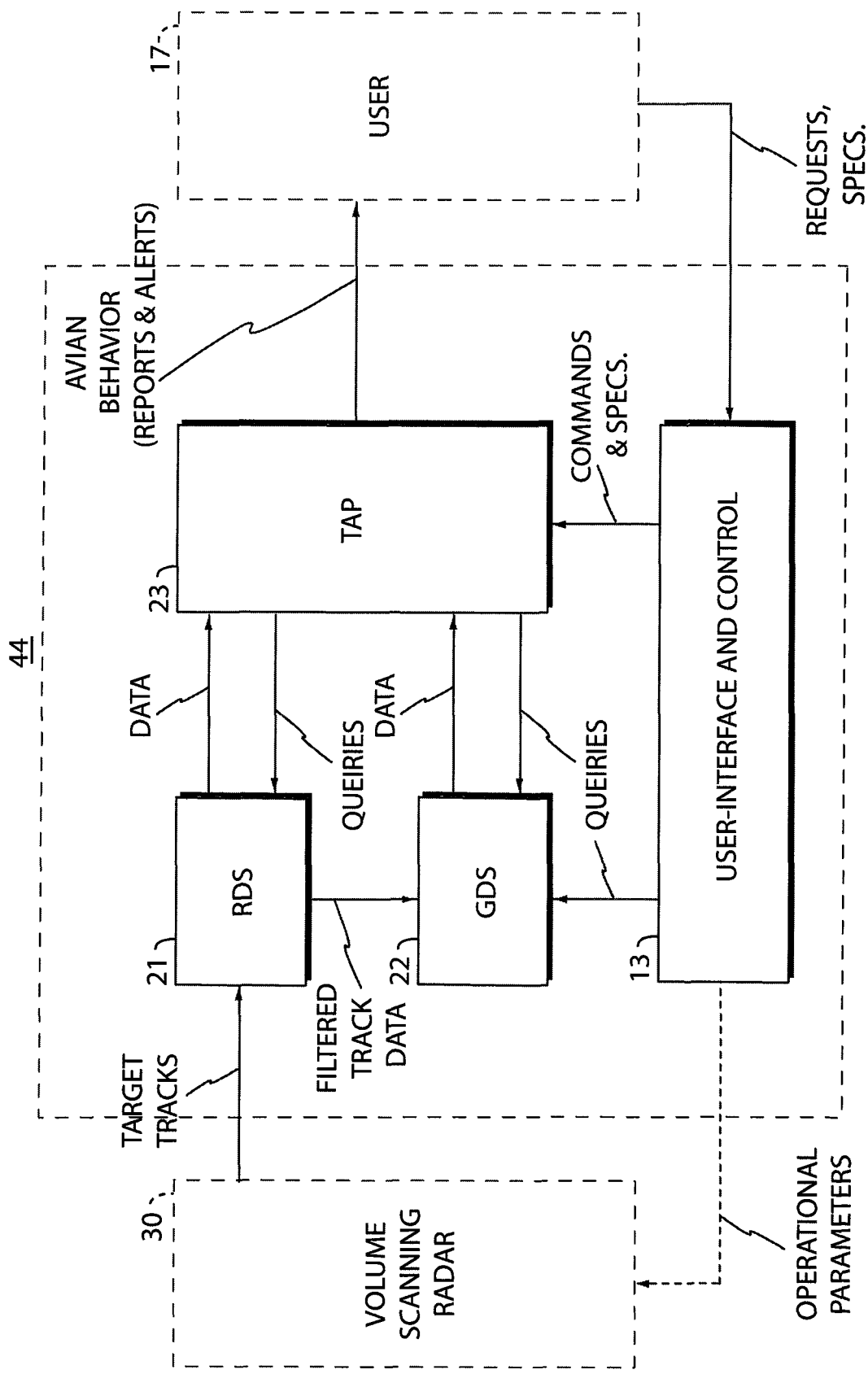
FIG. 4 shows a preferred embodiment of the Avian Track Interpretation apparatus in accordance with the present invention.

FIG. 4 shows a GIS-Based Avian Track Interpreter 44 which is a preferred embodiment of the Avian Track Interpretation engine 16 and can be used in place of Avian Track Interpretation engine 16 herein. The GIS-Based Avian Track Interpreter 44 includes a radar data server (RDS) 21, a Geographic Data Server (GDS) 22, and a Target Analytics Processor (TAP) 23. The DRP 10 of Volume Scanning Radar 12 (or 30) writes to RDS 21 in real-time. RDS 21 writes to GDS 22 in real-time, which reorganizes track data using Geographical Information System (GIS) constructs to support efficient spatial queries for activity reports. The TAP 23 runs various queries (on RDS 21 and GDS 22) and analytics on the fly (or in response to User 17 requests) to generate activity reports which are preferably published on a Web server for Intranet or Internet access by users. The Web server itself is preferably part of the TAP 23.

The GIS-based architecture of the Avian Track Interpreter 44 is key to being able to compute efficiently and deliver in a timely manner the avian activity reports in accordance with the present invention. Avian radars generate a wealth of target information, including track information which grows very quickly. The RDS 21 stores this data efficiently but the storage and organization is essentially time-ordered—i.e. rows of tables increment in time. This design is necessary to efficiently support real-time access by multiple users. However, the present invention requires avian behavior and activity reports which require a 3D spatial representation to convey the required information to users. For example, we are interested in avian activity in various geographical sub-volumes such as a particular aircraft take-off or landing corridor. This requires geographical sorting and 3D intersections of the bird trajectories with user-defined sub-volumes. To complicate matters further, these computations need to be carried out over a variety of time scales, from minutes, to hours, to days, weeks and even months. And once a particular data set is extracted, various, user-based filtering (as described below) requires additional computational effort and must be responsive to be useful. Unless the data is re-organized to account for both spatial and temporal aspects of the problem, and a divide-and-conquer approach is taken by computing various statistics on the fly so they are available to support queries when needed, the avian activity reports in accordance with this invention will not be practical. The RDS 21 and GDS 22 combination achieve this at the cost of essentially doubling the storage requirements of the Track Database 14 and increasing its computational capabilities. The GDS 22 results in a duplicate of track data re-organized with additional statistical elements as described earlier and further below. Queries in support of avian activity reports are distributed across the RDS 21 and GDS 22 as appropriate, for efficiency, with temporal aspects preferring the RDS 21 and spatial aspects preferring GDS 22. Preferably, both the RDS 21 and GDS 22 are implemented on high-transaction rate relational database management systems with GIS extensions and functionality exploited in the design of the GDS 22, its track data reorganizations, and in the execution of spatial and geographic SQL queries to exploit inherent computational efficiencies.

DRP 10, RDS 21, GDS 22, TAP 23, User-Interface and Control 13 and User 17 are preferably all part of computer network so they can communicate with each other. The computer network can be any combination of local area networks (LAN) and wide-area networks (WAN), including private and public networks such as the Internet. Network linkages can be wired (e.g. CAT5, CAT6, fibre) or wireless (e.g. WiFi, cellular, microwave point-to-point, SATCOM) and preferably run open and standard network protocols including TCP/IP, HTTP, HTTPS, web services, et cetera.

Figure 5:
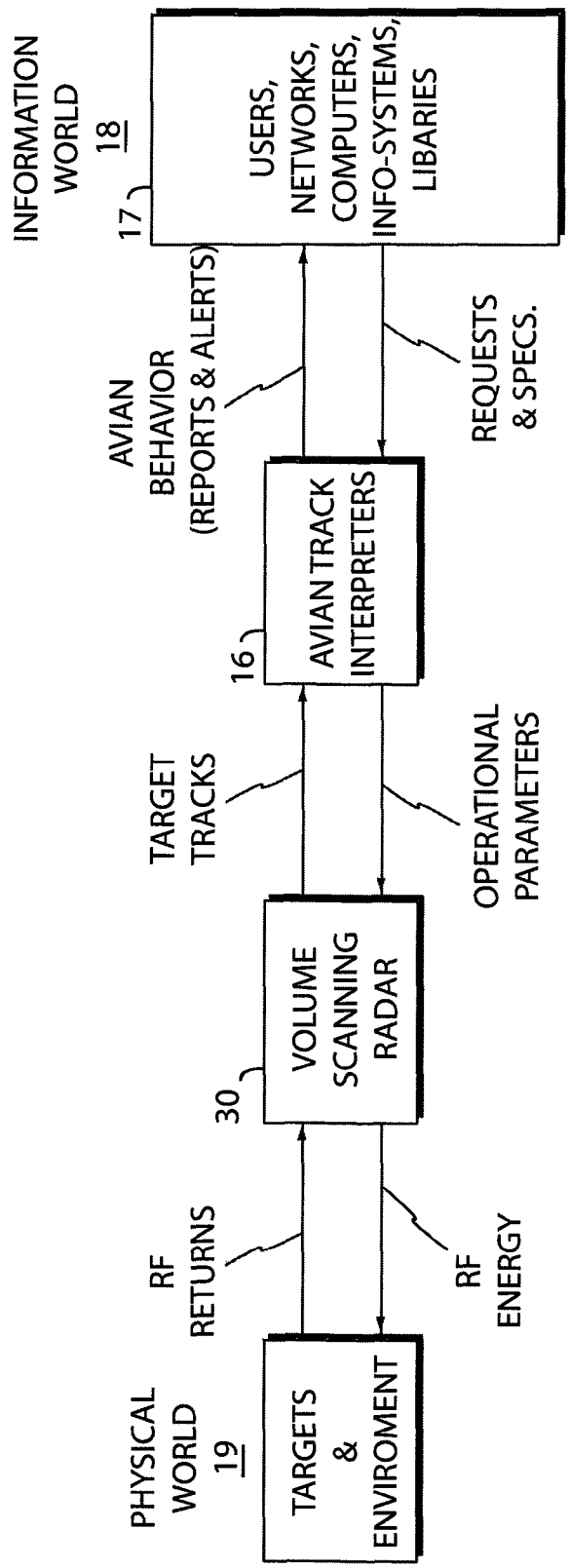
FIG. 5 is a block diagram of a network of 3D Avian Sampling Radar Apparatuses (the operatively connected avian radar and track interpreter systems), along with its connections to the environment and to end-users.

A block diagram of a 3D Avian Sampling Radar System incorporated into an Avian Radar Network 20 in accordance with the present invention is shown in FIG. 5. The Network 20 comprises one or more Volume Scanning Radars 30 connected to one or more Avian Track Interpreters 16. The Radars 30 sense bird targets in the Physical World 19 via transmission and reception of RF pulses. The Avian Track Interpreters 16 receive requests for reports from various Users 17 and deliver them to various entities in the Information World 18 preferably over a computer or data network. Volume Scanning Radars 30 and Avian Track Interpreters 16 are preferably connected over one or more computer networks as described earlier. Each Avian Track Interpreter 16 may be dedicated to a particular Volume Scanning Radar 30, or it may serve multiple Volume Scanning Radars 30.

Figure 6:
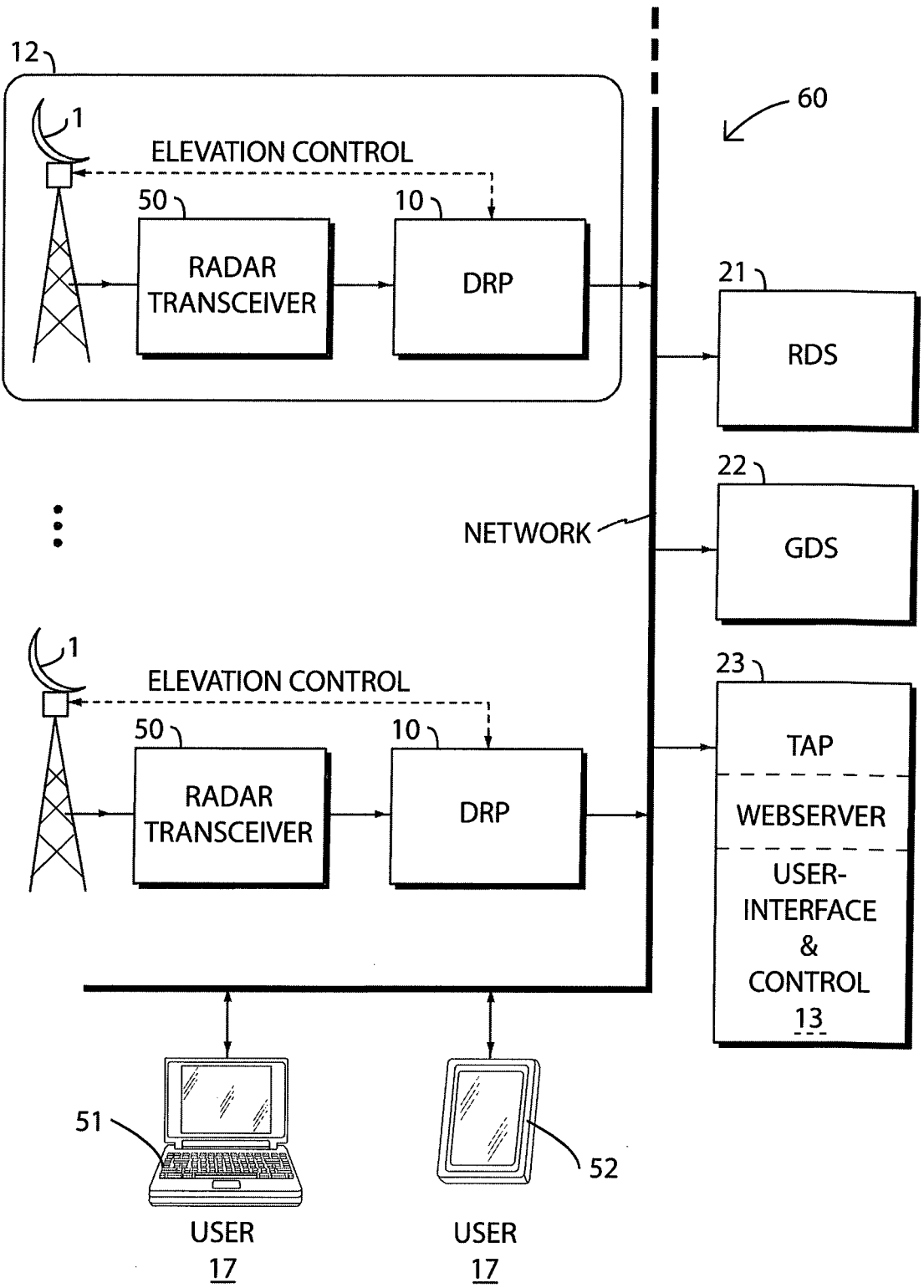
FIG. 6 is a block diagram of a preferred embodiment of a 3D Avian Sampling Radar Network in accordance with the present invention.

FIG. 6 provides an illustration of a preferred embodiment of the present invention. A network of one or more dual-axis scanning radars 12 are integrated into a 3D Avian Sampling Radar Network 60. Each dual-axis scanning radar 12 consists of a radar transceiver 50, that is preferably a marine radar transceiver, a DRP 10, and a dual-axis scanning dish antenna 1 whose elevation angle is controlled by the DRP 10. These volume scanning radars 12 send their target tracks over a TCP/IP network to an RDS 21 and GDS 22 where they are organized in real-time for subsequent activity report queries and computations. A TAP 23 runs queries on the RDS 21 and GDS 22 on-the-fly in response to User 17 requests, and generates and publishes avian behavior and activity reports for use by operators or users 17. RDS 21, GDS 22 and TAP 23 may be respectively single devices serving the entire network of dual-axis scanning radars 12, or they may each represent a respective plurality of respective devices where each one of such devices serves a particular one or more of the dual-axis scanning radars 12. Operators/users 17 can be anywhere on the network and use a computer 51 or mobile device 52 to interact with the 3D Avian Sampling Radar Network 60. The network of course includes the Internet.

The dual-axis radar scanners 12 of FIG. 6 may comprise at least two radar subsystems proximate to one another. The dual-axis scanning radars 12 may be operated so that each radar subsystem 12 illuminates a different sub-volume of a predetermined 3D target volume. The dual-axis radar scanners 12 may be operated side-by-side at different fixed elevation angles. Alternatively, the dual-axis radar scanners 12 may be operated side-by-side at different fixed azimuth angles. In another alternative operating configuration, one of the radar scanners 12 is operated as one or more 2D azimuth-rotating single-beam radar systems, while the other radar scanner 12 is operated as one or more 2D elevation-rotating single-beam radar systems.

Figure 7:
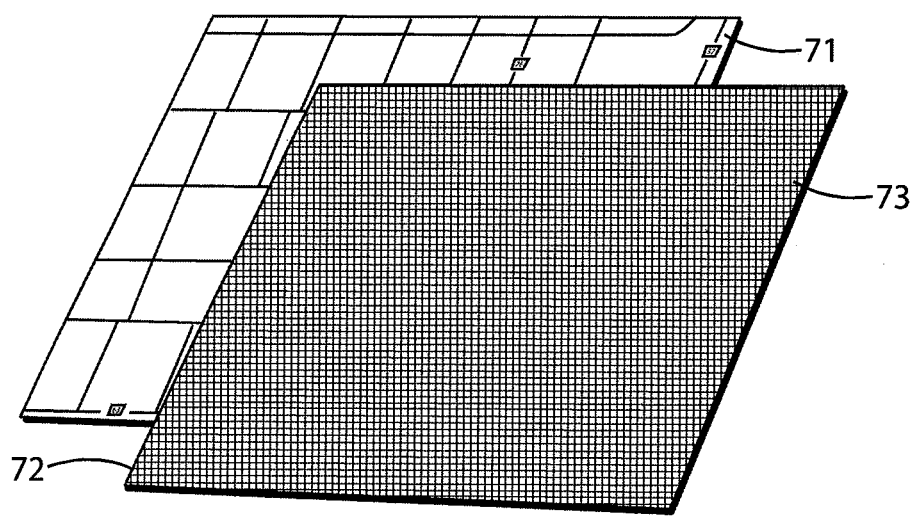
FIG. 7 shows an example of the structure of avian activity report in accordance with the present invention.

A pictorial representation of a Map-Based Avian Activity Report 75 is shown in FIG. 7. The Background Map Layer 71 displays topographical features underneath the surveillance volume. Displayed on top of the Map 71 is the Avian Activity Layer 72, which depicts information about bird activity at the respective locations depicted by the Background Map Layer 71. The Avian Activity Layer 72 is divided into a grid of preferably square Resolution Cells 73, and the information depicted for a given cell comprises the composite avian activity in the surveillance volume above the area covered by the cell. The activity information is depicted on the Avian Activity Layer 72 by methods known to those skilled in the art, including color shading, the overlay of symbols of varying size, shape and orientation, etc. The grid size of the Resolution Cells 73 is usually selected for a given aerodrome to reflect the size of the aerodrome. For example, a 50×50 grid covering a 10 km by 10 km airfield would result in 200*m* by 200*m* grid cells.

Figure 8:
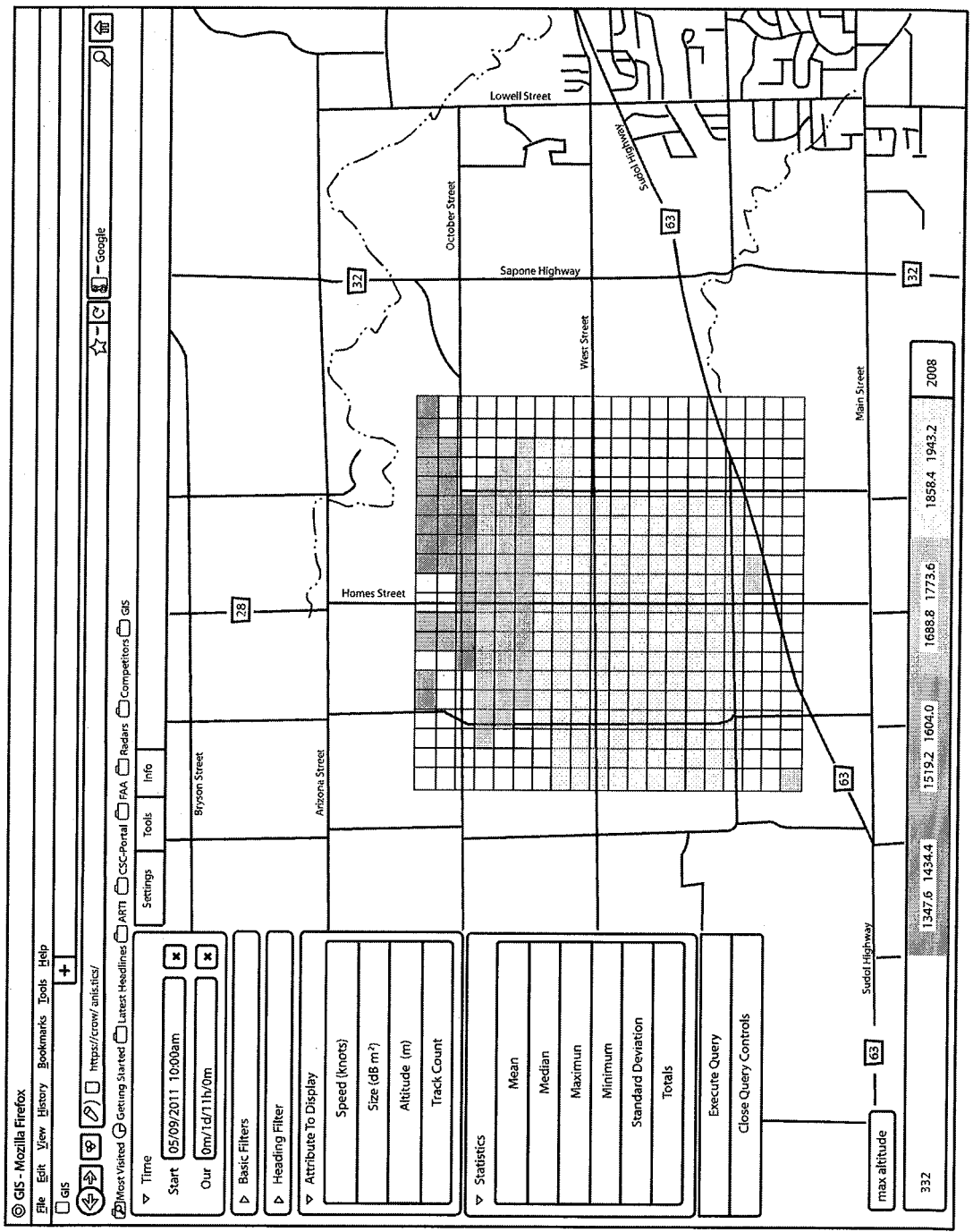
FIG. 8 shows an example of an avian activity report result and user interface in accordance with the present invention.

In accordance with the present invention, the bird attributes that can be presented in activity reports include, but are not limited to:
  1. Geographic Location
  2. Altitude
  3. Abundance
  4. Speed
  5. Heading
  6. Velocity
  7. RCS (radar cross section)
  8. Date and Time
  9. Track Length or Duration Each of these attributes can also be used for filtering (selecting) the bird tracks used in creating a given report. For example, only bird tracks with speeds above a user-specified minimum speed could be used in a report showing bird abundance or behavior via one or more of the other attributes. Typically, statistics of one bird attribute (e.g. altitude) will be "plotted" versus another attribute (e.g. location) while being filtered by still another attribute (e.g. time). Activity reports can be represented on a grid such as shown in FIG. 7 and FIG. 8. In addition to abundance, density can be calculated and represented along a particular line, row or column of the spatial grid. Whereas abundance reports the total number of birds observed, density reports it in terms of a rate, including numbers per unit time or area.

In accordance with the present invention, the forms of activity reports include, but are not limited to, combinations of:
  1. Text
  2. Charts
  3. Graphs
  4. Tables
  5. Images or Drawings (2D and 3D)
  6. Any combination of Colors, Shadings, Patterns, Contours, Lines, Arrows, Symbols, Numbers, Text, 3D shapes, all of these possibly varying in size and orientation, overlaid on a Background Map In accordance with the present invention, the bird attribute statistics that can be presented in activity reports include, but are not limited to:
1. Mean
2. Median
3. Maximum
4. Minimum
5. Variance or Standard Deviation
6. Histogram
7. Number (Count)
8. Density
9. Track Trajectories (Histories)

FIG. 8 illustrates a real-activity report generated in accordance with the present invention. A User-Interface and Control 13 is shown that runs in a Web browser and interacts with a TAP 23. A time interval is specified for the activity report, and the attribute to display is selected as altitude. The maximum altitude is the statistic used to calculate the altitude spatial distribution over a 20×20 grid which is overlaid onto a local map. Various additional filters, settings, tools and information are available/controllable through the user interface.

To illustrate the advantages of our preferred GIS-Based Avian Track Interpreter 44 and the need for the RDS 21 and GDS 22 combination, consider the following example. An hourly activity report (updated every 15 minutes) is desired that displays abundance information on a user-defined grid overlaid on the aerodrome. For each grid cell, the number of birds that flew over the cell's location in the past hour is computed and represented as a color on an image as illustrated in FIG. 8. Hot spots around the aerodrome will be readily recognized by operators who can direct response personnel when needed. In addition to the grid-based, spatial activity report, a total abundance versus time line graph is also desired, quantifying the total number of birds tracked over the aerodrome in the last hour and updated every 15 minutes. Let's examine the calculations needed to compute these activity reports. With an avian radar horizontally rotating at 24 RPM, 1440 scans will occur each hour. If a bird is present and tracked for the whole hour (e.g. a turkey vulture riding on thermals), its track could have as many as 1440 time updates. If a 50×50 grid is used, 2,500 grid cells are involved. Now the RDS 21 is time organized, listing for each of the 1440 scans (or update times) the track location update for each tracked bird, along with its track-ID. Imagine 100 birds are being tracked at any given time, and on average, each bird spends 5 minutes in the surveillance volume around the aerodrome. Assume that each bird is illuminated for an average of 1 minute during the volume scanning and hence each track has an average of 24 updates. As a result, (60/5)*100=1,200 unique birds will be tracked in each hour on average, with 28,800 track updates. The GDS 22, on the other hand, is updated on the fly and organized by targets with each target represented by a track from the RDS 21. Targets are objects that contain all of the location updates of the associated track in a single structure upon which geographical calculations can be easily carried out. If the RDS 21 is used to generate the total abundance versus time line graph, 1440 scans will need to be searched for each 1-hour period every 15-minutes to determine the number of unique track-IDs which represents the number of unique birds. If any target attribute filtering is further requested by the user (e.g. filter the line graph to include only those birds flying higher than 200' AGL), then 28,800 track updates will have to tested against the filter and the number of remaining unique track-IDs re-determined! In generating the grid-based spatial activity report, the computational requirements get completely out of hand if the RDS 21 is used. Each of the 28,800 track updates would have to be tested against each of the 2,500 grid cells (72,000,000 tests!) to determine if a given track-update crossed a particular cell. Then, for each group of updates crossing a particular cell, the number of unique track-IDs would re-determined to provide the abundance count. On the other hand, if the GDS 22 is used for these activity reports, the total abundance versus time line graph is easily generated simply by looking at the number of track objects generated during that hour. This information is readily available to the GDS 22 because it is organized by track objects to which are included attributes such as start and end time of the track, along with various other statistic metrics described earlier. In addition, once a group of track objects is selected (i.e. all those 1,200 track objects or birds from the last hour), efficient geographical operations can be applied against the geographical grid (using built-in GIS extensions associated with the GDS) to generate the required matrix of intersections of track objects and grid cells.

The frequency-scanning apparatus is an alternative elevation beam scanning system that could be used in the volume scanning radar 30, where tuning of the transceiver RF scans the beam in elevation, giving continuously selectable beam positions. The apparatus employs a flat-panel frequency-scanned phased-array antenna. Such an antenna delivers phased-array performance without the need for phase shifters, at much reduced cost. Lower sidelobes (than typical reflectors) can be achieved by careful design of the aperture taper. The radar transmitter and receiver must be rapidly tunable over a fairly wide bandwidth, which prevents the apparatus from using inexpensive COTS marine radars.

An alternative to a single volume scanning radar 30 consists of two (or more) side-by-side avian radars, where one radar subsystem operates at a lower elevation angle, the other radar subsystem at higher one. Each radar subsystem has its own receiver, A/D and processor. Tracks are combined in the avian track interpreter 16, which then creates the avian activity reports.

In complex applications, where both real-time monitoring and 3D sampling are required, preferred embodiments of obtaining the 3D surveillance volume in accordance with the present invention are as follows:
  i) Use one agile, dual-axis scanning radar 12 with dish antenna;
  ii) Use a non-agile dish (or array) plus an agile, dual-axis scanning radar 12 with dish antenna;
  iii) Use two agile, dual-axis scanning radars 12 each with dish Each of the above volume scanning systems can be mounted on a trailer for mobility if needed. The non-agile antenna in (ii) can be used to provide dedicated, continuous coverage over a priority zone such as the take-off and landing corridors of a runway. The agile antenna, on the other hand, can be used in a multi-function role, providing, at various times:
  a) cylindrical sampling to increase situational awareness everywhere;
  b) additional priority coverage to the non-agile antenna during the day; and sample other sub-volumes at night for migration for example;
  c) a larger coverage volume than a fixed dish could on its own, and providing better altitude estimates and improved RCS estimates by in accordance with U.S. Pat. No. 7,864,103 by scanning through targets in elevation and employing centroiding and interpolation techniques;
  d) a follower mode on a designated target of interest (requires feedback or independent location updates as described earlier herein); in follower mode, we get longer tracks on target of interest, additional data such as a full RCS profile; we can provide protective search volume around an unmanned aerial system (UAS) detecting general aviation aircraft in its vicinity for sense and avoid applications.

When two agile, dual-axis scanning radars 12 are available, maximum flexibility is afforded to serve both real-time monitoring and 3D sampling without compromise. For example, one agile radar can be set in real-time follower, providing sense and avoid to protect a UAS from immediate, hazardous general aviation aircraft and birds; while the second agile radar could be set in cylindrical sampling mode to provide tactical activity reports and enhanced situational awareness throughout the critical airspace in the vicinity of the aerodrome. These near-time activity reports capture persistent hazards or ones that are starting to build up—they give an early warning to operators so they can react before an immediate hazard is upon them. This combination of real-time tracking with near-time activity reports for situational awareness in critical airspaces represents a significant improvement in safety over the state-of-the-art.

Other scanning alternatives are possible, but the above are more suited to avian radars, where 360° azimuth coverage is usually required. One could scan quickly mechanically up-and-down (or around) in elevation while rotating slower in azimuth on a large turntable. One could scan in both dimensions in a back-and-forth raster mode (electronic, mechanical, or both). While a phased-array antenna could be integrated into the radar sensor of the present invention, it is not a preferred embodiment of the present invention due to the significantly higher cost anticipated for such an antenna.

Preferably, embodiments of a volume-scanning radar system as disclosed herein aim to take advantage of standardized COTS technologies to the maximum extent possible in order to keep the system cost low and to provide for low life cycle costs associated with maintainability, upgrade ability and training. Preferably, COTS marine radars are used as the radar sensor in order to minimize sensor costs. The radar processor 10 incorporates sophisticated algorithms and software that runs on COTS personal computers (PC). Preferred embodiments provide a low-cost, high-performance, land-based radar sensor designed for avian radar applications. Preferred embodiments digitize the raw radar video signal from the marine radar receiver and use a PC-based radar processor with sophisticated processing such as the detection, tracking and display processing described in U.S. Pat. No. 7,940,206 entitled "Low-cost, High-performance Radar Networks," which is incorporated herein by reference and further described below.

The radar processor 10 preferably incorporates a detection processor and a track processor. The detection processor performs radar signal processing functions known to those skilled in the art such as scan-conversion, clutter suppression through the use of adaptive clutter-map processing to remove ground and weather clutter, sector blanking to suppress detections and interference in regions that are not of interest, adaptive thresholding such as constant false alarm rate (CFAR) processing, and digital sensitivity time control (STC). The detection processor declares the presence and location of target plots preferably on each radar scan. The information on each plot preferably includes time, range, azimuth, elevation, and amplitude. The track processor sorts the scan-to-scan time-series of plots into either target tracks or false alarms. The information on each tracked target preferably includes time and estimated 3D spatial position, velocity, and RCS. A plot-to-track association algorithm provides means to resolve ambiguities produced by multiple targets, missed detections, false alarms, and maneuvering targets, whereas a track filtering algorithm provides high quality estimates of target dynamics for the association algorithms and for the activity illustrator. The track processor preferably uses a sophisticated plot-to-track association algorithm called Multiple Hypothesis Tracking (MHT) and preferably uses an advanced track-filtering algorithm called Interacting Multiple Model (IMM) filtering as described in U.S. Pat. No. 7,940,206.

The volume scanning radar 30 provides continuous writing of target data directly to the track database 14. The track database 14 can reside locally on the radar processor computer, on another computer on the network, or on both. Track data can easily be stored continuously, 24/7, without stressing the storage capacity of a COTS PC. The track database 14 is preferably also used for other forms of post-processing, for interaction with external geographical information systems (GIS) systems, for remote radar displays, for support for web services, and for further research and development. Track database 14 preferably can also send real-time target data to display processors, which can display tracks in real-time on an operator's monitor or computer display.

With state-of-the-art avian radars, the target data can be presented to end-users on real-time displays. A background map is integrated with the display on which is overlaid geo-referenced radar data. With the volume scanning aspects of the current invention, a preferred addition to state-of-the-art avian radar real-time displays is to allow the end-user to display recent tracks with the altitude and other information encoded. The end-user can select how long a "memory" the display has, e.g. the last 30 minutes. This gives a time-evolving up-to-the-minute picture of the developing avian activity. Colors, text and/or symbols can depict attributes of the individual tracks (e.g. altitude, RCS). The tracks can be displayed with lines or arrows depicting their trajectories. Alternatively, user-specified statistical summaries of recent avian behavior can be displayed, in the same manner as map-based activity reports. The display effectively becomes a real-time version of an avian activity report.

The present invention does not always have to be in a 3D volume scanning mode. It can be switched under user-control to continuously cover a certain sub-volume. When operating in a non-volume scanning mode, all of the displays, alerts and avian activity reports can still be available; the information they depict, while still being geo-referenced in 3D (latitude, longitude, altitude), will only apply to the sub-volume. In particular, a system outfitted with a non-volume-scanning radar can still use the second part of the present invention.

The track data produced by state-of-the-art avian radars contains detailed (but compact) behavior information on individual targets. For any given scenario, these data can be automatically tested for hazardous activity, in order to generate alerts. Because the information is detailed, alerts can reflect complex behavior, such as origins and destinations of birds, runway approaches, density, etc. Target detection, tracking and hazard recognition algorithms may be customized for specific hazards and scenarios. Alerts can include an audible alarm and display indication to an operator, or a transmitted message to a remote end-user. The low-bandwidth track and alert information can be easily sent to central locations, and directly to end-users, providing economical, effective monitoring. Automated alerts may be sent to remote end-users who require them. This enables the avian radar system to run unattended with end-users alerted only when necessary. Furthermore, track displays can be provided to remote end-users to give them a clear picture of the situation when alerts arise. The system can exploit COTS communication technology to provide such remote alerts and displays inexpensively. The present invention can preferably provide alerts, whether it is in 3D volume scanning mode or not. The alerts can be tailored to account for the 3D components of the track information. Alerts are, in effect, brief real-time avian activity reports.

For some avian radar applications, one volume-scanning radar sensor, or even several independently operating radars may not be enough to provide a high-performance, composite picture covering the area of interest. For any single radar, there are gaps in coverage due to obstructions, and the area covered may not be a wide enough. In accordance with the present invention, one or more volume-scanning radars are preferably connected to a network to send their composite information to a common track database, which can preferably be accessed at a central monitoring station (CMS). The CMS preferably has a fusion processor that integrates and/or fuses the data from the multiple sources. A common avian track interpreter preferably creates composite avian activity reports using data from either the common track database or the fusion processor.

Many of the aforementioned radar processor features as well as features not mentioned above are described in the articles *Low-cost Radar Surveillance of Inland Waterways for Homeland Security Applications*, Weber, P et al., 2004 IEEE Radar Conference, Apr. 26-29, 2004, Philadelphia, Pa., and *Affordable Avian Radar Surveillance Systems for Natural Resource Management and BASH Applications*, Nohara, T J et al, 2005 IEEE International Radar Conference, May 9-12, 2005, Arlington, Va. and U.S. Pat. No. 7,940,206, all of which are incorporated herein by reference.

Particular features of our invention have been described herein. However, simple variations and extensions known to those skilled in the art are certainly within the scope and spirit of the present invention. This includes variations on integration of the functional blocks described herein. For example, the A/D module 8 could be integrated with the processor 10 forming a single functional unit, without departing from the spirit of the invention.

What is claimed is:

1. A 3D radar sampling system used for monitoring and presenting the airborne activity within a surveillance volume, comprising:
    at least one volume-scanning radar device that tracks airborne targets;
    a track database operatively connected to said volume-scanning radar system for organizing and storing, in time-ordered form and in spatial-ordered form, track data generated by said volume-scanning radar device; and
    an airborne-target activity illustrator operatively connected to said track database that converts subsets of said organized and stored track data into airborne-target activity reports.

2. The system defined in claim 1 wherein said track database includes a radar data server configured to organize and store, in time-ordered form, track data from said at least one volume-scanning radar device, said track database further including a geographical data server operatively connected to said radar data server and configured to organize and store, in spatial-ordered form, track data from said radar data server.

3. The system defined in claim 2 wherein said airborne-target activity illustrator is part of a target analytics processor, said target analytics processor being also configured to compute one or more statistical measures of track data on the fly.

4. The system defined in claim 3 wherein said target analytics processor is particularly configured in part to compute one or more statistical measures of spatially ordered track data on the fly.

5. The system defined in claim 1 wherein said volume-scanning radar device has an antenna and driving elements operatively linked to said antenna for rotating said antenna rapidly in azimuth and slowly in elevation.

6. The system defined in claim 1 wherein said volume-scanning radar has an antenna with a rapid rotation in elevation and a slow change in azimuth.

7. The system defined in claim 1 wherein said volume-scanning radar device includes drive elements operatively connected to said antenna for moving same in a scan pattern, said volume-scanning radar device further including a digital radar processor that is operatively connected to said drive elements for controlling the scan pattern, said digital radar processor being software configured to enable a modification of said scan pattern according to sampling requirements.

8. The system defined in claim 7 wherein said digital radar processor is configured to use updates from a global positioning system, as to the position of an unmanned aerial system, to provide elevation control to said antenna to follow the unmanned aerial system and to provide a continuous, protective surveillance volume around the unmanned aerial system, said track data including track data specific to all general aviation aircraft and birds that may potentially come into conflict with the unmanned aerial system.

9. The system defined in claim 7 wherein said scan pattern includes a rate of change of elevation of said antenna, said digital radar processor being configured to change said rate of change according to sampling requirements.

10. The system defined in claim 1 wherein said activity reports include attributes of bird abundance and behavior at selected locations over selected time-intervals.

11. The system defined in claim 10 wherein said attributes comprise statistics about bird numbers, locations, altitudes, RCS, speeds, headings, and velocities.

12. The system defined in claim 1 wherein said activity reports include a combination of text, charts, graphs, tables, images, and drawings.

13. The system defined in claim 1 wherein said activity reports include an activity information layer overlaid on a geographic background map, said layer including indicators taken from the group consisting of colors, shadings, patterns, contours, lines, arrows, symbols (2D and 3D), numbers, and text.

14. The system defined in claim 1 wherein said database and said illustrator are configured to form an airborne-target track interpretation engine.

15. The system defined in claim 14 wherein said engine is GIS-based.

16. A method of sampling the abundance and behavior of airborne targets, comprising:
    operating a radar system to illuminate sub-volumes of a 3D volume and detect and track airborne targets within, the operating of the radar system including varying a pointing angle of a radar antenna so as to illuminate different sub-volumes of the 3D volume;
    collecting and organizing radar data from said radar system to generate temporally ordered track information and spatially ordered track information about the airborne targets tracked within the 3D volume over time;
    storing the temporally ordered track information and the spatially ordered track information; and
    generating reports that convey statistical information about bird abundance and behavior during selected time intervals and at selected locations within the 3D volume, the generating of said reports including accessing the stored temporally ordered track information and the stored spatially ordered track information.

17. The method defined in claim 16 wherein said operating and varying comprises operating a volume-scanning radar pursuant to a scanning protocol that produces a periodic sampling of a large volume.

18. The method defined in claim 17 wherein the operating of said volume-scanning radar includes executing multiple scans along one coordinate direction for each single scan along another coordinate direction.

19. The method defined in claim 16 wherein said collecting and organizing and accessing comprise writing to and querying one or more databases having a portion containing said temporally ordered track information and a portion containing said spatially ordered track information.

20. The method defined in claim 16 wherein said operating, varying, accessing and creating are in accordance with end-user requests and specifications.

21. The method defined in claim 16, further comprising distributing said reports to end-users over a network.

22. The method defined in claim 16, further comprising accessing said organized temporally ordered track information and said spatially ordered track information to detect hazards or situations of interest in accordance with end-user requests and specifications, also comprising automatically notifying or alerting end-users in real time of the detected hazards or situations of interest.

23. The method defined in claim 16, further comprising filtering said organized temporally ordered track information and said spatially ordered track information according to one or more specific bird attributes each taken from the group consisting of bird abundance, density, locations, altitudes, speeds, headings, velocities and RCS.

24. The method defined in claim 16 wherein said bird behavior includes bird density, locations, altitudes, speeds, headings, velocities and RCS.

25. The method defined in claim 16 wherein said radar system includes at least two radar subsystems proximate to one another, said varying comprising operating said at least two radar subsystems so that each radar subsystem illuminates a different said sub-volume.

26. The method defined in claim 16 wherein the operating of said radar system to illuminate sub-volumes includes operating two or more 2D azimuth-rotating single-beam radar systems operating side-by-side at different fixed elevation angles.

27. The method defined in claim 16 wherein the operating of said radar system to illuminate sub-volumes includes operating two or more 2D elevation-rotating single-beam radar systems operating side-by-side at different fixed azimuth angles.

28. The method defined in claim 16 wherein the operating of said radar system to illuminate sub-volumes includes operating one or more 2D azimuth-rotating single-beam radar systems operating side-by-side with one or more 2D elevation-rotating single-beam radar systems.

29. The method defined in claim 16 wherein said activity reports include near-term activity reports to highlight developing hazardous situations, further comprising providing real-time track display information to enable the locating and directing of responses to particular hazardous situations.

30. An airborne-target track interpretation apparatus comprising
a radar data server (RDS) organizing and storing time-ordered track information pertaining to multiple airborne objects in a radar-scanned volume,
a geographical data server (GDS) operatively connected to said radar data server, said geographical data server organizing and storing spatial-ordered track information pertaining to said multiple objects; and
a target analytics processor (TAP) operatively connected to both said RDS and said GDS,
wherein said radar data server is operatively connectable to one or more digital radar processors (DRPs) for receiving radar target data therefrom and organizing and storing said radar track data as said time-ordered track information, and
wherein said analytics processor is configured to generate airborne-target activity reports for users from selected portions of said time-ordered track information and selected portions of said spatial-ordered track information.

31. The apparatus defined in claim 30 wherein said GDS is configured to receive radar target data from said DRPs in real-time.

32. The apparatus defined in claim 30 wherein said TAP is configured to execute queries on said RDS and GDS and to generate airborne-target activity reports incorporating up-to-date or current radar target data, periodically or in response to requests from said users.

33. The apparatus defined in claim 30 wherein said TAP is configured to publish said activity reports on a Web server for Intranet or Internet access by said users.

34. A method of track interpretation for the timely delivery of airborne-target activity reports, comprising:
receiving target data from an airborne-target radar;
immediately storing said data in a relational SQL database in a time-based form, said database structured for temporal activity report queries;
re-organizing the stored data of said time-based form into a GIS-based form, said GIS-based form being structured to facilitate spatial activity report queries; and
storing the re-organized data in said GIS-based form.

35. The method defined in claim 34 wherein the re-organizing of the stored data into said GIS-based form includes generating target-object trajectory or spatial track data.

36. The method defined in claim 35 wherein the re-organizing of the stored data into said GIS-based form further includes indexing additional target object data to said trajectory or spatial track data, said additional data taken from the group consisting of speed, direction, RCS and altitude data.

37. The method defined in claim 34, further comprising receiving queries requesting access to target data, and selectively providing access to time-based data in said database and data in said GIS-based form, in accordance with temporal and geographical components of the requested target data.

38. A volume-scanning device comprising:
an antenna;
an azimuth scanner operatively coupled to the antenna for continuously rotating same about an azimuth axis;
an elevation scanner operatively connected to the antenna for selecting an elevation pointing angle;
a radar transmitter operatively connected to the antenna for generating a radar signal for emission via the antenna;
a radar receiver operatively connected to the antenna; and
a processor operatively connected to azimuth scanner and said elevation scanner for modifying the elevation pointing angle after each predetermined set of one or more revolutions of said azimuth scanner so as to scan a 3D volume via multiple revolutions of said azimuth scanner and a single cycle of movement of said elevation scanner, said processor being operatively connected to said receiver for detecting and localizing airborne targets in azimuth, elevation and range.

39. A method of volume scanning for airborne targets comprising:
operating a radar system to illuminate a first sub-volume of a 3D volume, a radar antenna of said radar system having a first elevation pointing angle during the illuminating of said first sub-volume;
in response to the illuminating of said first sub-volume, detecting and tracking airborne targets within said first sub-volume;
after the operating of said radar system to illuminate said first sub-volume, varying the elevation pointing angle of said antenna to have a second elevation pointing angle different from said first elevation pointing angle;
operating said radar system to illuminate a second sub-volume of said 3D volume, said radar antenna of said radar system having said second elevation pointing angle during the illuminating of said second sub-volume; and
in response to the illuminating of said second sub-volume, detecting and tracking airborne targets within said second sub-volume.

40. A method of monitoring airborne targets, comprising:
operating a first scanning radar apparatus to monitor at least one priority sub-volume of a 3D volume in real-time; and
contemporaneously with the operating of said first scanning radar apparatus, operating a multi-function dual-axis second scanning radar apparatus to monitor at least another sub-volume of said 3D volume.

41. The method in claim 40 wherein the operating of said second scanning radar apparatus comprises 3D airborne-target sampling.

42. The method in claim 40 wherein the operating of said second scanning radar apparatus comprises additional priority coverage in real time.

43. The method in claim 40 wherein the operating of said second scanning radar apparatus comprises providing altitude estimates and RCS estimates by scanning through said airborne targets in elevation and employing centroiding and interpolation techniques.

44. The method in claim 40 wherein the operating of said second scanning radar apparatus comprises operating in a follower mode on a designated airborne target of interest.

45. The method in claim 40 wherein the operating of said second scanning radar apparatus comprises operating said multi-function dual-axis second scanning radar apparatus in different modes at different times or under user control.

46. Radar system componentry for use in surveillance of a substantial 3D volume over an extended period, said componentry comprising:
a database; and
a processor configured to process time-ordered track data to generate spatial-ordered target-object data including trajectory-ordered track data pertaining to respective target objects, said trajectory-ordered track data encoding trajectories that extend in space, said processor being coupled to said database for storing said spatial-ordered target-object data and said trajectory-ordered track data therein,
wherein said processor is a geographical data processor, further comprising a radar data processor operatively linked to said geographical data processor for providing said time-ordered track data thereto, said radar data processor being operatively connectable to one or more scanning radar devices for receiving radar data therefrom, said radar data processor being configured to organize and store said radar data as said time-ordered track data.

47. The radar system componentry defined in claim 46, further comprising a target analytics processor operatively connected to said radar data processor and said geographical data processor for accessing said time-ordered track data and said spatial-ordered track data and to generate activity reports selectively utilizing same in response to user requests.

48. The radar system componentry defined in claim 46 wherein said trajectory-ordered track data stored in said database includes a time element that has a secondary status at most.

49. The radar system componentry defined in claim 48 wherein said time element is included by indexing.

50. The radar system componentry defined in claim 46 wherein said target-object data includes information taken from the group consisting of direction, speed, velocity, target cross-section (RCS), and altitude, in a statistical attribute format in easy-to-search indexed or tabular form.

51. A radar surveillance method comprising:
receiving radar scan data from at least one radar device, said radar scan data being generated during repeated 3D scans of a substantial preselected volume, said radar scan data pertaining to numerous target objects within said volume;
organizing and storing said radar scan data in the form of time-ordered track data in a first relational SQL database, said first relational SQL database structured for temporal activity report queries;
organizing and storing said radar scan data in the form of spatial-ordered track data in a second relational SQL database, said second database structured for spatial activity report queries; and
accessing or enabling selective access to said first database and said second relational SQL database in accordance with temporal and geographical components of requested target data, thereby facilitating spatial-temporal activity reports generation.

52. The method defined in claim 51 wherein said spatial-ordered track data includes trajectory-ordered track data pertaining to respective target objects, said trajectory-ordered track data encoding trajectories that extend in space.

53. The method defined in claim 51 wherein said first relational SQL database and said second relational SQL database are parts of a single composite database.

54. The method defined in claim 51, further comprising generating spatial-temporal activity reports in response to incoming queries and making said reports available to sources of the respective queries.

55. The method defined in claim 51, further comprising organizing the time-ordered track data in said first relational SQL database and the spatial-ordered track data in said second relational SQL database and so that the time-ordered track data and the spatial-ordered track data can be efficiently queried at the same time as new track data are being stored.

* * * * *